US005140342A

United States Patent [19]

Metildi et al.

[11] Patent Number: 5,140,342

[45] Date of Patent: Aug. 18, 1992

[54] SINGLE PASS SCANNED LASER COLOR PRINTER

[75] Inventors: Frederic H. Metildi, Penfield; J. Kelly Lee; Badhri Narayan, both of Rochester, all of N.Y.

[73] Assignee: Eastman Kodak Company, Rochester, N.Y.

[21] Appl. No.: 580,403

[22] Filed: Sep. 10, 1990

[51] Int. Cl.[5] ...................... G01D 15/10; G01D 15/14

[52] U.S. Cl. .................................. 376/76 L; 346/108

[58] Field of Search ................ 346/76 L, 76 pH, 108, 346/134, 106; 355/27, 67, 68, 32

[56] References Cited

U.S. PATENT DOCUMENTS

| | | | |
|---|---|---|---|
| 3,351,948 | 11/1967 | Bonn | 346/76 L |
| 4,614,950 | 9/1986 | Ito | 346/76 PH |
| 4,626,868 | 12/1986 | Tsai | 346/1.1 |
| 4,710,781 | 12/1987 | Stephenson | 346/76 PH |
| 4,755,831 | 6/1988 | Sakamoto | 346/1.1 |
| 4,764,444 | 8/1988 | Simons et al. | 430/47 |
| 4,804,975 | 2/1989 | Yip | 346/76 L |
| 4,812,354 | 3/1989 | Sugiyama et al. | 428/195 |

FOREIGN PATENT DOCUMENTS

| | | | |
|---|---|---|---|
| WO89/02832 | 6/1989 | Int'l Pat. Institute . | |
| 0020764 | 1/1986 | Japan | 346/76 PH |

*Primary Examiner*—Benjamin R. Fuller
*Assistant Examiner*—David Yockey
*Attorney, Agent, or Firm*—Raymond L. Owens

[57] ABSTRACT

Apparatus for thermal printing of a color image includes a donor member that contains a set of color stripes for each pixel in a repeating pattern in the cross-scan direction and in continuous stripes in the page scan direction. As the printing beam is scanned across the donor, it addresses the sequence of color dyes and if the beam is of sufficient intensity at any one of the color stripes; it causes the dye to transfer to the receiver material. To compensate for variations in the scan rate of the beam, light reflected from the donor member is used to form color timing signals that correspond to the color stripes of the pattern scanned by the beam. The timing signals align the modulation of the beam to the color stripe pattern of the donor member whereby accurate color registration is obtained.

16 Claims, 16 Drawing Sheets

1000

1700

1300

1400

1500

1600

SINGLE PASS SCANNED LASER COLOR PRINTER

FIELD OF THE INVENTION

The invention relates to color printing and more particularly to identification of color heat transferable dyes in dye transfer thermal printing of color images.

BACKGROUND OF THE INVENTION

In dye transfer thermal printing, heat applied to a dye coated donor web member transfers the dye to a receiver material such as paper. The heat may be supplied by a source comprising a row of closely spaced resistive heat elements or a scanning light beam such as a laser. Image information signals determine the quantity of heat provided by the source at each pixel of the image. The amount of dye transferred from the donor member to the image pixel of the receiver is directly related to the quantity of heat supplied to the donor member. By varying the heat to the donor member, the image pixel receives more or less dye whereby the pixel density may be made to correspond to the image information signal. For monochrome images, each pixel is formed by a black dye. For color images, each pixel may comprise varying amounts of cyan, magenta and yellow dyes or varying amounts of blue, green and red dyes. U.S. Pat. No. 4,804,975 (issued to K. Yip on Feb. 14, 1989) discloses a thermal dye transfer arrangement that illustrates dye transfer utilizing a modulated laser diode.

Color dye transfer printing may involve mosaic or extremely narrow stripes of different colors which are selectively heated. U.S. Pat. No. 4,812,354 (issued to Takeo Sugiyama et al. on Mar. 14, 1989), for example, discloses a color image recording material in which hot melt inks are arranged in a mosaic or in stripes of widths in the order of 100 microns. The mosaic is exposed to develop a color image and the image is transferred to a receiver material. The preparation of the mosaic or stripe pattern, however, is relatively complex and color processing involves an exposure step followed by a printing step.

U.S. Pat. No. 4,764,444 (issued to Michael J. Simons et al. on Aug. 16, 1988) discloses a transfer element with a mosaic pattern of heat transferable dyes in which there is selective exposure of imaging layers after determining the location of the dye pattern to register the correct color components of the pattern. The registration is accomplished by a scanning laser or by orientation of the mosaic pattern with fixed positions such as perforations.

An alternative dye transfer arrangement involves passing the separate color donor material and one common receiver material through a scanning system once for each color. The thermal printing is repeated for the three or four separate colors that are used. As a result, the dye transfer process is relatively slow and suffers from color registration difficulties. A single scan is more efficient but provisions must be made for color registration. U.S. Pat. No. 4,710,781 (issued to Stanley W. Stephenson on Dec. 1, 1987) discloses a thermal printer color dye frame identification arrangement in which red and yellow light sources pass through a carrier having a repeated series of spaced frames of yellow, magenta and cyan colored heat transferable dyes onto detectors to identify the dye frames of the repeating dye frame series in a thermal printer. Such arrangements improve color registration, but require multiple donor passes.

The aforementioned color printing techniques require multiple step processes which increase the time required for printing. U.S. Pat. No. 4,626,868 (issued to Irving R. Tsai on Dec. 2, 1986) discloses a single pass printing arrangement in which a uniform toner mixture responds to a laser of particular wavelength to transfer a selected toner of the mixture to the printing surface. This single pass system, however, requires a uniform toner mixture and a relatively complex multi-wavelength laser system.

It is desirable to provide high speed single pass printing with simpler light and dye transfer arrangements than are known to be in use.

SUMMARY OF THE INVENTION

The present invention is directed to thermal dye transfer printing apparatus for printing a color image comprising a source of image data signals having a plurality of different color image signals for each pixel of the image, an image receiver having a plurality of pixel locations for receiving the color dyes corresponding to image signals, a donor member adjacent to the receiver comprising successive patterns of colored stripes, each pattern having a plurality of successive color stripes associated with a pixel location and each color stripe comprising a different color dye component, a light beam former, a modulator coupled between image data signal source and the light beam former responsive to the image data signals for producing a signal to modulate the light beam in the light beam former with the image data signals, means for applying the modulating signal to the light beam former, means for scanning the modulated light beam across the successive patterns of the donor member to transfer the different color dyes from the donor member to the receiver in accordance with the image data signals, and means coupled between the donor member and the modulating means for aligning the image data signal modulated light beam to the successive color stripes of the patterns.

In accordance with one aspect of the invention, each pattern of color stripes of the donor member comprises a reflective stripe and a plurality of color dye stripes.

In accordance with another aspect of the invention, the means coupled between the donor member and the modulating signal producing means for aligning the modulated light beam to the color stripe pattern responds to light from the modulated light beam reflected by the reflective stripe of each pattern for generating an index signal. A sequence of color stripe timing signals is formed in alignment with the scanned color stripes of the donor member.

In accordance with yet another aspect of the invention, each pattern comprises a plurality of color dye stripes. A predetermined one of the color dye stripes further comprises a reflective component.

In accordance with yet another aspect of the invention, the light beam former produces a first light beam of a prescribed intensity and a second modulated light beam. The first light beam is of low intensity to align the modulation of the second light beam to the color stripes of each donor member pattern. The second light beam is modulated by the image data signals to transfer the color dyes of the pattern stripes to the pixel locations of the receiver.

In accordance with yet another aspect of the invention, the light beam former produces a broad spectrum light beam as well as a modulated light beam and each pattern of the donor member comprises a cyan, a magenta and a yellow color stripe. The broad spectrum light reflected from the color stripes of the pattern are divided into red, green and blue spectral portions. A signal corresponding to each spectral portion is formed and a color timing signal is generated for each color stripe responsive to the intensities of the spectral portion signals.

In an illustrative embodiment of the invention, a beam modulation processor combines image data signals from an image signal source and color timing signals from a color registration circuit to form a light beam modulating signal. A beam former produces a light beam modulated by the beam modulating signal. The modulated light beam is directed to a donor member having a color stripe pattern for each pixel location. Each pattern includes a reflective stripe. Light reflected by the color stripe pattern is detected. In response to the detected light, a pattern index signal is supplied to the color registration circuit which forms color timing signals for the pattern that are aligned with the color stripes on the donor member.

The invention will be better understood from the following more detailed description taken with the accompanying drawings and claims.

DETAILED DESCRIPTION

Figure 1:
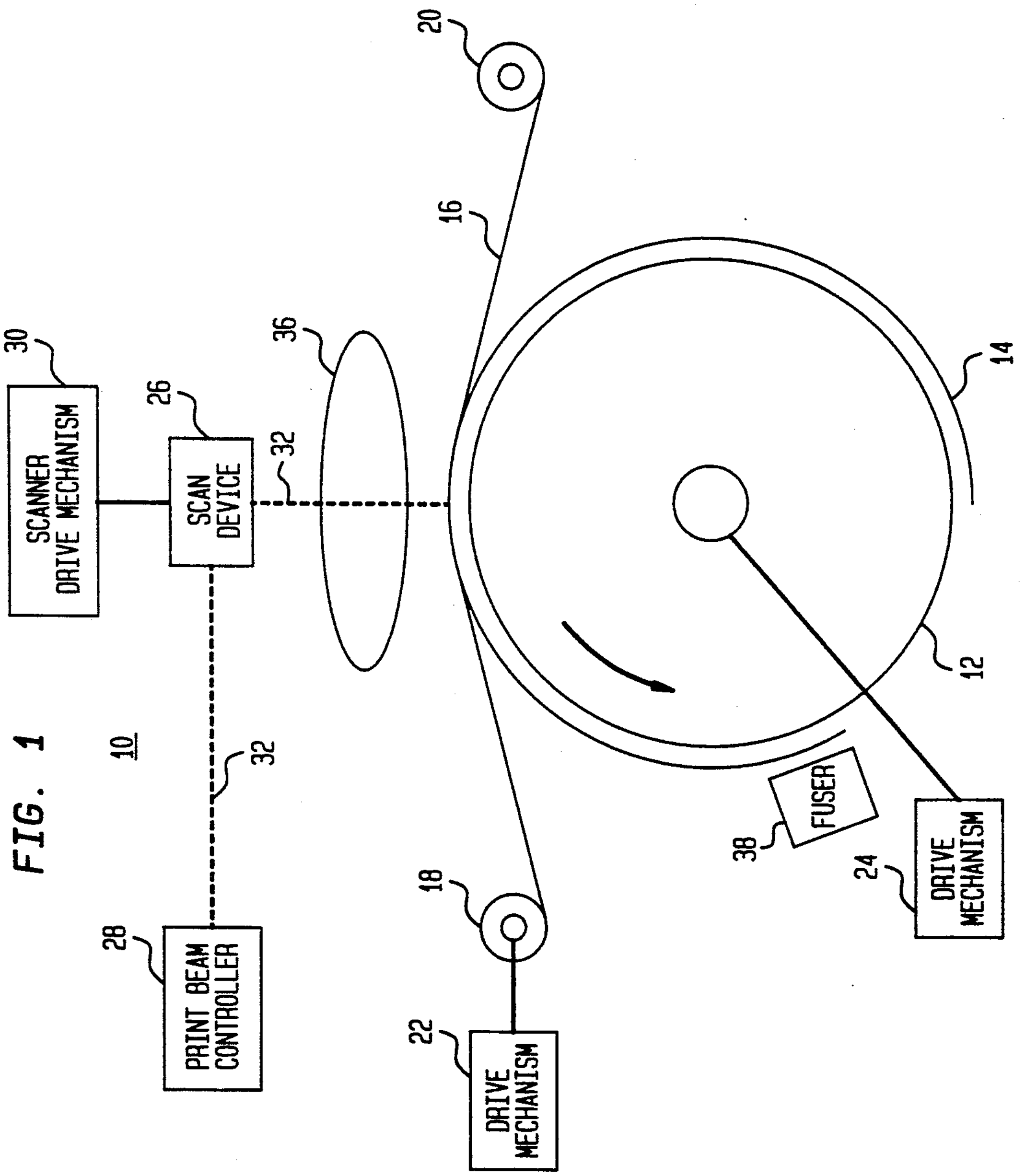
FIG. 1 is a schematic and block diagram of a thermal printer in which the present invention may be employed.

Referring now to FIG. 1, there is shown a dye transfer thermal printer apparatus 10 in which the present invention may be employed. The thermal printer apparatus 10 comprises a rotatable drum 12, a receiver member 14 in the form of a sheet, drive mechanisms 22 and 24, a carrier donor member 16 in the form of a web, a supply roller 20, a take-up roller 18, a light beam scan device 26, a telecentric focusing lens 36, a print beam controller 28, a fuser 38, and a scanner drive mechanism 30. The print beam controller 28 comprises an image data source, a light beam modulation processor and a light beam former which are all not shown. The drive mechanism 22 comprises a motor (not shown) mechanically coupled to the take-up roller 18. The carrier donor member 16 is disposed between the supply roller 20 and the take-up roller 18 and passes over the receiver member 14. The drive mechanism 24 includes a motor (not shown) that is mechanically coupled to the rotatable drum 12. The receiver member 14 is secured to the drum 12. The scanner drive mechanism 30 includes a motor (not shown) that drives the light beam scan device 26.

Drive mechanisms 22 and 24 cause the take-up roller 18 and the drum 12 to rotate and thereby advance the carrier member web 16 and the receiver member 14. The drum 12 rotates in a counter-clockwise direction as indicated. The fuser 38 heats the color dyes of each pixel in the receiver 14 so that the color dyes flow over the pixel as is well known in the art. The print beam controller 28 forms a light beam 32 which is received by the light beam scan device 26. The scanner drive mechanism 30 causes the light beam scan device 26 to redirect the light beam 32 so that it scans across the donor member 16. The light beam 32 passes through the telecentric lens 36 which focuses the beam at successive pixels of a print line as the beam scans across the donor member 16. In operation, the light beam 32 is formed in the print beam controller 28. The intensity of the light beam 32 (shown as a dashed line) is controlled by image pixel signals stored in the print beam controller 28. The light beam 32 is deflected by the scan device 26 so that it traverses a print line across the donor member 16. The light beam 32 locally heats the donor member 16 at each pixel location along the print line whereby dye in the donor member is transferred from the donor member 16 to the print line pixel location in the receiver 14. The optical density at the pixel on the receiver 14 is determined by the amount of dye that is transferred in response to the image pixel signal in the print beam controller 28. Dye is transferred to successive print lines in accordance with the intensity of the light beam 32 which is controlled by the image data in the print beam controller 28 as the drum 12 and the take-up roller 18 are continuously advanced. As a result, the image defined by the data in the print beam controller 28 is placed on the receiver member 14.

For color images, the dye transfers of three or four different colors (e.g., cyan, magenta, yellow and possibly black) to the receiver must be coordinated to provide proper registration for each pixel. In one known system, the donor member comprises a mosaic of different dyes. It is necessary, however, to expose the receiver prior to printing. This results in a slower process than is desirable in some applications. In another known arrangement, the donor carrier has three or four separate color segments. Dye transfer takes place by passing the separate color donor material and the common receiver material through the scanner arrangement three or four times (once for each color). The sequential dye transfer is relatively slow and results in poor color registration. According to the invention, the speed of color printing and color registration are significantly improved by arranging the different color dyes on the donor member and synchronizing the light beam scan to the color dye arrangement on the donor member so that only a single scan is needed for a color print.

Figure 2:
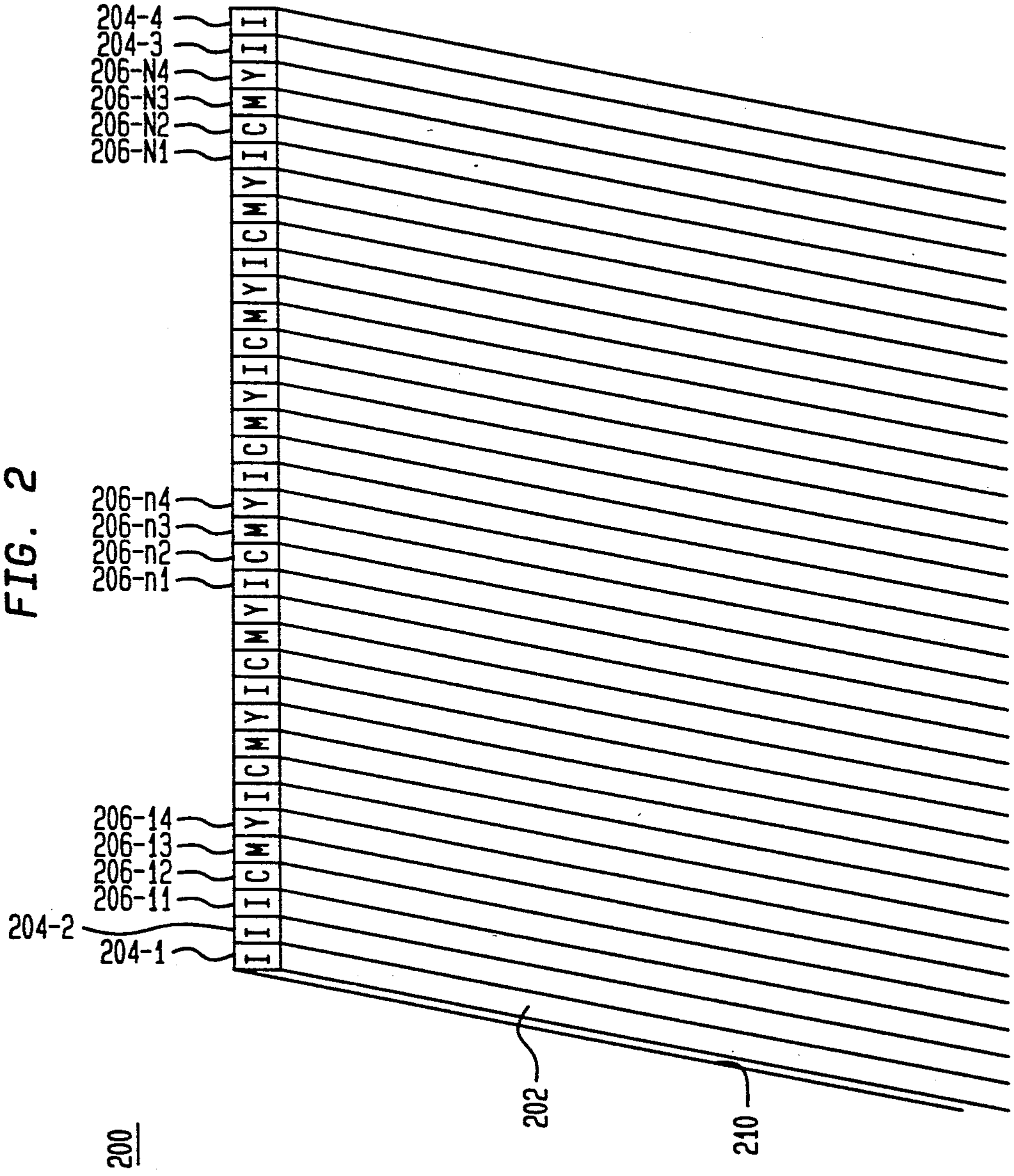
FIG. 2 is a more detailed view of the striped donor member used in the thermal printer of FIG. 1 in accordance with the present invention.

Referring now to FIG. 2, there is shown a view of an embodiment 200 of the donor member 16 of FIG. 1. The donor member embodiment 200 comprises a sheet 202 which includes a heat absorbing layer 210 that is partitioned into narrow stripes 204-1, 204-2, 206-11, 206-12, 206-13, 206-14, . . . , 206-n1, 206-n2, 206-n3, 206-n4, . . . , 206-N1, 206-N2, 206-N3, 206-N4, 204-3, and 204-4. The stripes 206-11, 206-12, 206-13, 206-14, . . . , 206-N1, 206-N2, 206-N3 and 206-N4, are arranged in a repeated sequence of an index, a cyan, a magenta, and a yellow stripe across the donor member in the direction of the scan. Each stripe extends along the donor member in the direction perpendicular to the scan. For example, stripe 206-11 is an index stripe adapted to reflect incident light. The stripe 206-12 is a cyan stripe. The stripe 206-13 is a magenta stripe. The stripe 206-14 is a yellow stripe. Stripes 206-n1, 206-n2, 206-n3 and 206-n4 are index, cyan, magenta, and yellow, respectively. This stripe pattern is repeated across the donor member 16 until the stripe sequence 206-N1, 206-N2, 206-N3 and 206-N4. End stripes 204-1, 204-2, 204-3, and 204-4 are index stripes which define the edges of the donor member in the scanning direction and aid in color registration. Each color stripe has a color dye component and a heat absorbing component so that the dye may be transferred in response to the light beam incident thereon. Each index stripe is highly reflective to provide color registration. The widths of the stripes in one set of stripes (e.g., 206-n1, 206-n2, 206-n3, and 206-n4) in the donor member 16 are selected to supply any combination of cyan, magenta and yellow dyes to a single pixel location on the receiver member 14. In operation, a light beam scan is synchronized to the stripe pattern by reflections from the successive index stripes. A scanning beam is successively modulated by the cyan pixel data, the magenta pixel data and the yellow pixel data in synchronism with the scanned stripes. In this way, each pixel receives the combination of cyan, magenta and yellow dyes required by the image data signals as it scans across the donor member.

Figure 3:
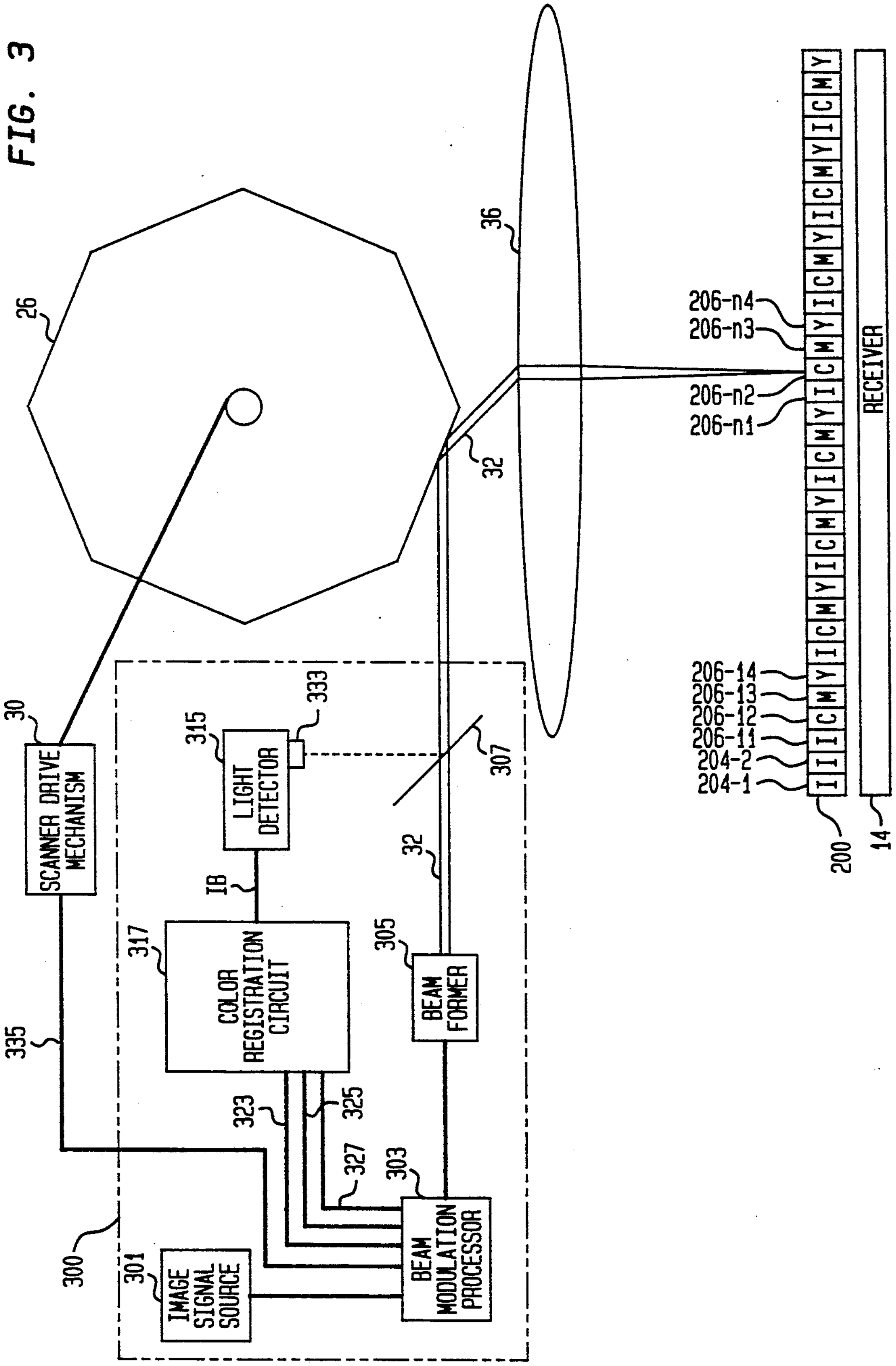
FIG. 3 is a more detailed schematic and block diagram of an embodiment of a beam scanning arrangement in the thermal printer of FIG. 1 in accordance with the present invention showing the donor member and receiver in cross-section.

Referring now to FIG. 3, there is shown the scanner drive mechanism 30, the scan device 26, the telecentric focusing lens 36, the donor member 200 described with respect to FIG. 2, the receiver 14, and an embodiment 300 (shown within a dashed line rectangle) of the print beam controller 28 of FIG. 1. The embodiment 300 comprises an image signal source 301, a beam modulation processor 303, a beam former 305, a partial mirror 307, a light detector 315, and a color registration circuit 317.

The image source 301 is coupled to a first input of the beam modulator processor 303. A first output terminal of the beam modulator processor 303 is coupled to an input of the beam former 305. A second output terminal of the beam modulation processor 303 is coupled to an input terminal of the scanner drive mechanism 30. A light beam 32 at an output of the beam former 305 is optically coupled through partial mirror 307 to the scan device 26 and therefrom through the telecentric focusing lens 36 to the donor member 200. A light receiving input 333 of the light detector 315 receives a reflected light beam (shown as a dashed line) from the partial mirror 307. The partial mirror is of an appropriate type to maximize the reflected light beam to the light receiving input 333. An output of the light detector 315 is coupled to an input of the color registration circuit 317. First, second and third timing output terminals of the color registration circuit 317 are coupled to first, second, and third timing signal input terminals of the beam modulation processor 303 via lines 323, 325, and 327.

In FIG. 3, image data signals for the successive lines of an image to be printed are generated in the image signal source 301. A set of three image data signals are formed for each pixel of the line to be printed. A first image data signal determines the optical density of the cyan component of the pixel. A second image data signal determines the optical density of the magenta component of the pixel and a third image data signal determines the optical density of the yellow component of the pixel. The beam modulation processor 303 receives the first, second and third image data signals for the pixels of the line to be printed and forms a beam modulating signal which is successively controlled by the cyan, magenta and yellow image data signals. The beam modulating signal is applied to the beam former 305 wherein the light beam 32 is formed. The intensity of the light beam 32 is modulated by the beam modulating signal from the beam modulator processor 303 as is well known in the art. For example, the light beam may be generated by a laser diode having its current controlled by the beam modulating signal from the beam modulation processor 303. In this way, the intensity of the light beam 32 is varied in accordance with the cyan, magenta and yellow image data signals in the beam former 305. Each pixel location on the receiver member 14 receives controlled quantities of cyan, magenta and yellow dyes corresponding to the cyan, magenta and yellow image data signals assigned to the pixel whereby the color of the pixel is determined.

The light beam 32 from the beam former 305 passes through the partial mirror 307 and is redirected by the scan device 26 through the telecentric focusing lens 36 to successive pixel locations on the scan line of the donor member 200. During the scan, the light beam 32 impinges on successive index stripes (e.g., 206-11, 206-n1). Since the index stripes are highly reflective, light is reflected therefrom and by the partial mirror 307 to the light receiving input 333 of the light detector 315. The light detector 315 generates an indexing signal when the light at its light receiving input exceeds a prescribed threshold. The light detector 315 produces indexing signals at regular intervals corresponding to the reflective index stripes (e.g., 204-1, 204-2, 206-11, . . . , 206-n1, . . . ). The indexing signals are supplied to the input of the color registration circuit 317 which is adapted to synchronize the operation of the beam modulation processor 303 to the color stripe pattern of the donor member 200 so that accurate color registration is achieved.

As is well known in the art, the rate at which a scanner such as the scan device 26 in FIG. 3 scans a print line may vary significantly as the light beam passes over the successive color stripes of the donor member. Consequently, the cyan, magenta and yellow components of the beam modulation signal may not be aligned with the color stripes of the donor 200. Misalignment between the beam modulation and the color stripes results in poor color registration. For example, the scanning light beam may have a magenta modulating signal while the beam impinges on a different color stripe of the donor member. In accordance with the invention, a reflected light beam is processed to assure that the beam modulation is accurately aligned with the color stripes of the donor member.

Figure 4:
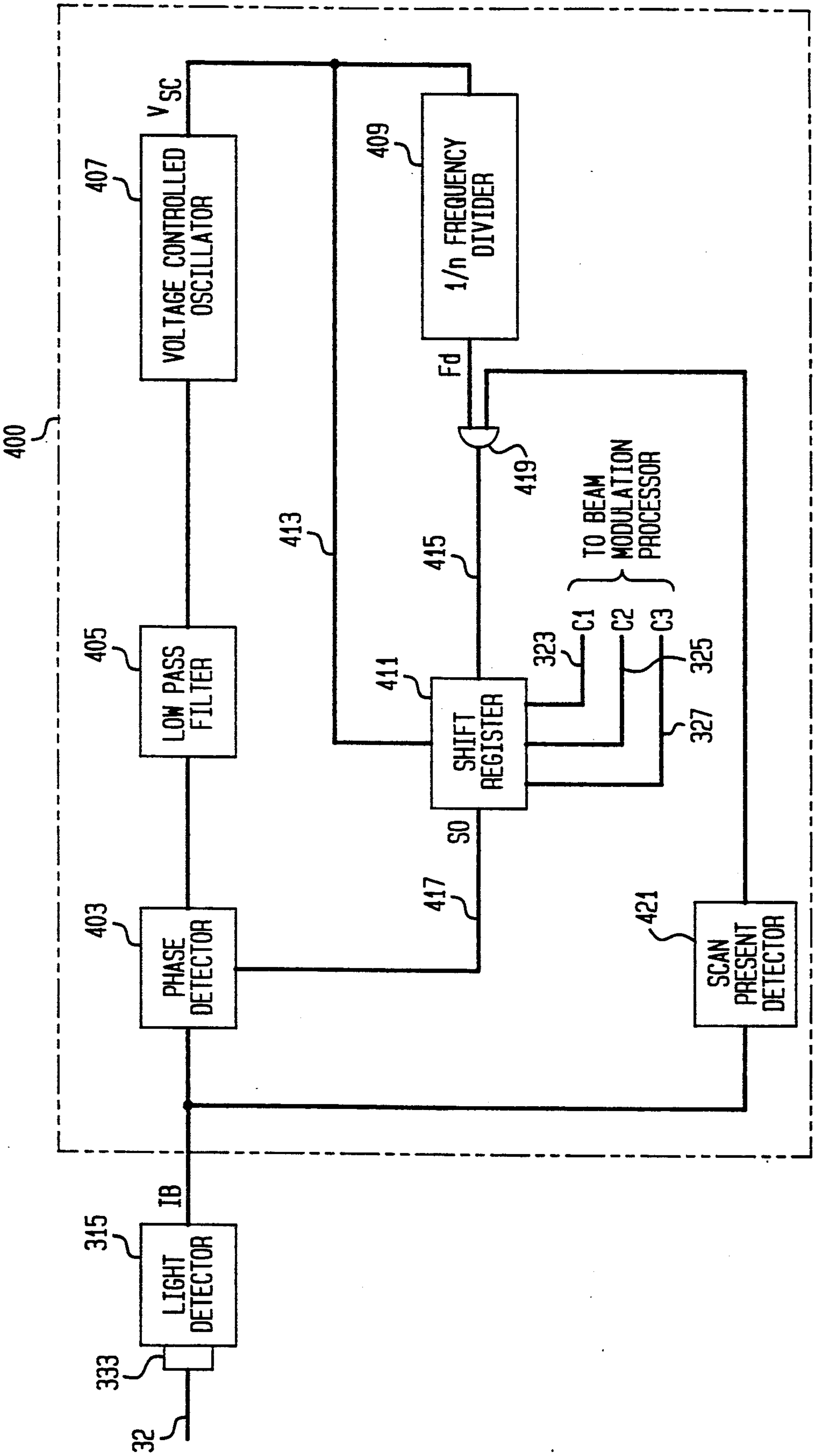
FIG. 4 is a block diagram of an embodiment of a color registration circuit used in the beam scanning embodiment of FIG. 3.

Referring now to FIG. 4, there is shown the light detector 315 of FIG. 3 and an embodiment 400 (shown within a dashed line rectangle) of the color registration circuit 317 of FIG. 3. The embodiment 400 comprises a phase detector 403, a low pass filter 405, a voltage controlled oscillator 407, a frequency divider 409, an AND gate 419, a shift register 411, and a scan present detector 421. In FIG. 4, the light receiver 333 of the light detector 315 is optically coupled to the partial mirror 307 shown in FIG. 3. An electrical output of the light detector 315 is coupled to a first input of the phase detector 403 and to an input of the scan present detector 421. An output of the scan present detector 421 is coupled to a first input of the AND gate 419. A second input of the phase detector 403 is coupled to a first output of the shift register 411. An output of the phase detector 403 is coupled to an input of the low pass filter 405 and an output of the low pass filter 405 is coupled to an input of the voltage controlled oscillator 407. An output of the voltage controlled oscillator 407 is coupled to an input of the frequency divider 409 and to an input of the shift register 411. An output of the frequency divider 409 is coupled to a second input of the AND gate 419. An output of the AND gate 419 is coupled to the input of the shift register 411. A second output of the shift register 411 is coupled to the line 323 of FIG. 3. A third output of the shift register 411 is coupled to the line 325 and a fourth output of the shift register 411 is coupled to the line 327.

In operation, the voltage controlled oscillator 407 is initially set to a frequency corresponding to the nominal scan rate of the print line by the scan device 26 of FIG. 3. The scan present detector 421 provides an enabling signal to AND gate 419 in response to the immediately successive index signals from the end stripes 204-1 and 204-2. The output pulses Fd from the frequency divider 409 are then applied to the input of the shift register 411 through the AND gate 419 for the duration of the scan. At the end of the scan, the scan present detector disables the AND gate 419.

During the scan, the output of the voltage controlled oscillator 407 is a succession of pulse signals Vsc each of which corresponds to the scan of a color stripe in the donor 200 of FIG. 3. The 1/n frequency divider 409 receives the Vsc pulses from the voltage controlled oscillator 407 and generates an output pulse signal Fd for every n pulses at its input as is well known in the art. The Fd pulses are supplied at the 1/n Vsc pulse rate to the input of the shift register 411 through the AND gate 419 and a line 415. The Vsc pulses are applied to the shift input of the shift register 411 via a line 413. The shift register 411 is adapted to shift the received Fd pulses successively so that a signal C1 appears on the line 323 in one time period, a signal C2 appears on the line 325 in a succeeding time period, a signal C3 appears on the line 327 in another succeeding time period, and a signal SO appears on the line 417 at the end of the last time period. The time periods need not be adjacent. While three color stripe timing signals C1, C2, and C3 are illustrated in FIG. 4, it is to be understood that the number, duration and sequencing of the color stripe timing signals may differ according to the color stripe pattern employed in the donor member 200. For example, if the four color stripe sequence (e.g., cyan, magenta, yellow, and black) is used, n=4 and the shift register embodiment 400 produces four color timing signals in time periods corresponding to the color stripe arrangement.

The light detector 315 receives the reflected light beam 32 from the successive index stripes (e.g., 206-n1) of the donor member 200 in FIG. 3 and supplies a signal IB responsive thereto to the first input of the phase detector 403. The signal on the line 417 of the shift register 411 is compared with the signal IB in the phase detector 403. As a result of the comparison of the signal IB with the signal SO, the phase detector 403 generates a signal representative of the time difference between the signals IB and SO. The time difference signal is low pass filtered in the filter 405 which produces an error signal. The error signal corresponds to the difference between the scan rate of the scan device 26 and the frequency of the voltage controlled oscillator 407. The error signal modifies the frequency of the voltage controlled oscillator 407 to bring its output pulses Vsc into synchronism with the pulses IB. As a result, the signals C1, C2 and C3 from the shift register 411 are synchronized to the scan rate of the reflective index stripes on the donor member 200 in FIG. 3. Any change in the scan rate modifies the error signal generated by the phase detector 403 so that the frequency of the voltage controlled oscillator corresponds to the scan rate of the scan device 26.

In the embodiment 300 of FIG. 3, each color stripe period has a duration T. The shift register 411 has four stages corresponding to the four time periods. The 1/n frequency divider is a ¼ divider so that one pulse Fd occurs for every four Vsc pulses from the voltage controlled oscillator 407. The color registration timing pulse C1 is obtained from the second stage of the shift register 411. The timing pulse C2 is obtained from the third stage of the shift register and the timing pulse C3 is obtained from the fourth stage of the shift register. The pulse shifted out of the fourth shift register stage is applied to the phase detector 403.

Figure 5:
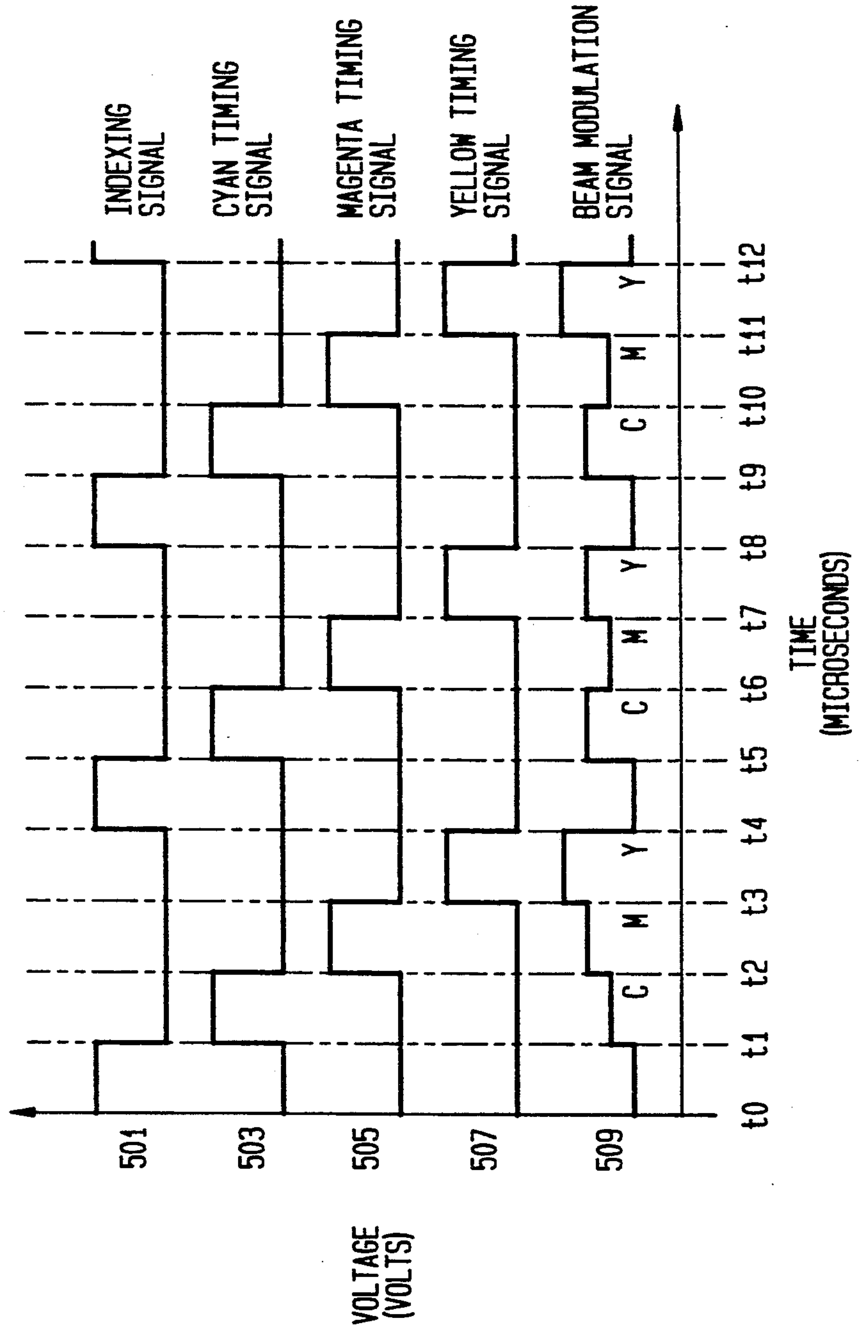
FIG. 5 shows waveforms useful in illustrating the operation of the embodiment of the invention shown in FIG. 3.

Referring now to FIG. 5, there are shown graphically pulse waveforms (volts) as a function of Time (microseconds) illustrating the indexing signals from the light detector 315, the color registration timing signals C1, C2, and C3 from the color registration circuit 317, and the beam modulation signal resulting from the color registration timing pulses C1, C2, and C3 at the output of the beam modulation processor 303. For purposes of illustration, the magnitudes of the waveforms are shown as uniform. A waveform 501 shows the indexing signals IB at the output of the light detector 315. Waveforms 503, 505, and 507 show the cyan timing pulses, the magenta timing pulses, and the yellow timing pulses, respectively, on lines 323, 325 and 327, respectively. Lines 323, 325, and 327 are coupled to the timing inputs of the beam modulation processor 303. A waveform 509 shows the beam modulation signal output of the beam modulation processor 303.

The indexing signals IB in the waveform 501 occur at regular intervals (e.g., between times t0 and t1, t4 and t5, and t8 and t9). The signals IB occur as the light beam 32 scan across reflective index stripes of the donor member 200 in the embodiment 300. For purposes of illustration, consider the scan of the stripes 206-n1, 206-n2, 206-n3, and 206-n4 in FIG. 3. These stripes are over a pixel location n in the receiver member 14 of FIG. 3. The waveforms in FIG. 5 corresponding to these stripes may, for example, extend from time t4 to t8. The intensity of the light beam 32 is held to a low level except during the dye transfer phases of its operation when signals C1, C2 or C3 is present. The modulation signal of the waveform 509 is at a level determined by the cyan, magenta and yellow image data signals when the C1, C2 and C3 timing signals are high. When the light beam 32 is at its low intensity, there is no dye transfer but reflections of the low intensity light beam from the index stripes may be detected.

The light reflected from the index stripe 206-n1 exceeds the predetermined threshold of the light detector 315 and produces the positive indexing pulse signal between times t4 and t5 in the waveform 501. The phase detector 403 of the embodiment 400 of the color registration circuit 317 in FIG. 4 receives the indexing pulse signal. The shift register 411 successively generates a cyan timing pulse C1 in the interval between times t5 and t6 (waveform 503), a magenta timing pulse in the interval between times t6 and t7 (waveform 505), and a yellow timing pulse in the interval between times t7 and t8 (waveform 507). Each color timing pulse occupies the entire interval.

Figure 13:
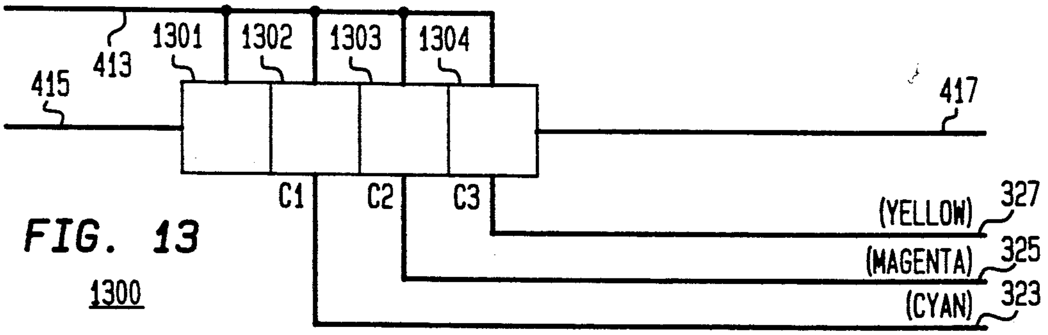
FIG. 13 is a more detailed block diagram of an embodiment of a shift register adapted for use in the color registration circuit of the embodiment of FIG. 3 with the donor member shown in FIG. 2.

Referring now to FIG. 13, there is shown a more detailed block diagram of an embodiment 1300 of the shift register 411 of FIG. 4. The shift register embodiment 1300 comprises shift register stages 1301, 1302, 1303, and 1304. A data input of the shift register is coupled to the line 415 which is further coupled to the frequency divider 409 via the AND gate 419 in FIG. 4. A shift input of each of the shift register stages 1301, 1302, 1303, and 1304 is coupled to the shift line 413 which is further coupled to the output of the voltage controlled oscillator 407 in FIG. 4. An output of the shift register stage 1302 is coupled to the cyan timing signal line 323. An output of the shift register stage 1303 is coupled to the magenta timing signal line 325. A first output of the shift register stage 1304 is coupled to the yellow timing signal line 327. A second output of the shift register stage 1304 is coupled to the line 417 which is further coupled to the second input of the phase detector 403.

In operation, the shift register embodiment 1300 receives data pulses from the frequency divider 409 on the line 415 via the AND gate 419. Each shift register stage receives shift pulses from the voltage controlled oscillator 407. The shift pulses transfer the data pulses in each stage to the succeeding stage once every T seconds. The cyan timing pulse on the line 323 is obtained from the stage 1302 in the second T time period. The magenta timing pulse on the line 325 is obtained in the third T time period from the stage 1303 and the yellow timing pulse on the line 327 is obtained in the fourth T time period from the stage 1304.

The beam modulation processor combines the cyan image data signal from the image signal source 301 with the cyan beam timing pulse on the line 323 to form the cyan portion of the beam modulating pulse shown in the waveform 509 in the interval between the times t5 and t6. In similar fashion, the beam modulation processor combines the magenta image data signal from the image signal source 301 with the magenta beam timing pulse on the line 325 to form the magenta portion of the beam modulating pulse shown in the waveform 509 in the interval between the times t6 and t7. The beam modulation processor combines the yellow image data signal from the image signal source 301 with the yellow beam timing pulse on the line 327 to form the beam modulating pulse shown in the waveform 509 between the times t7 and t8. The beam modulation signal may be formed in a signal processor well known in the art by setting the signal magnitude to the value of each color image data signal for the time interval of the color timing pulse and converting the signal magnitude to an analog signal.

During each time interval between successive index stripes (e.g., between times t4 and t8), a particular pixel location of the scan line is addressed. In the first T portion of the interval subsequent to the indexing signal pulse IB, the beam modulated by the cyan image signal transfers a quantity of cyan dye corresponding to the cyan image data signal to the addressed pixel location of the receiver member 14. The quantity of cyan dye transferred is determined by the cyan image data signal for the addressed pixel. In the second interval subsequent to the indexing signal pulse, the beam modulated by the magenta image signal transfers a quantity of magenta dye corresponding to the magenta image signal to the addressed pixel location of the receiver member 14. During the third interval subsequent to the indexing signal pulse, the beam modulated by the yellow image signal transfers a quantity of yellow dye corresponding to the yellow image signal to the addressed pixel location of the receiver member 14. As a result, accurate color registration is maintained and the successive pixels of the color image are printed in a single pass of the scan beam. The process described for the pixel location associated with the stripes 206-n1 through 206-n4 is repeated for each successive pixel of the scan line and the successive scan lines whereby the color image is produced in the receiver member 14.

Figure 6:
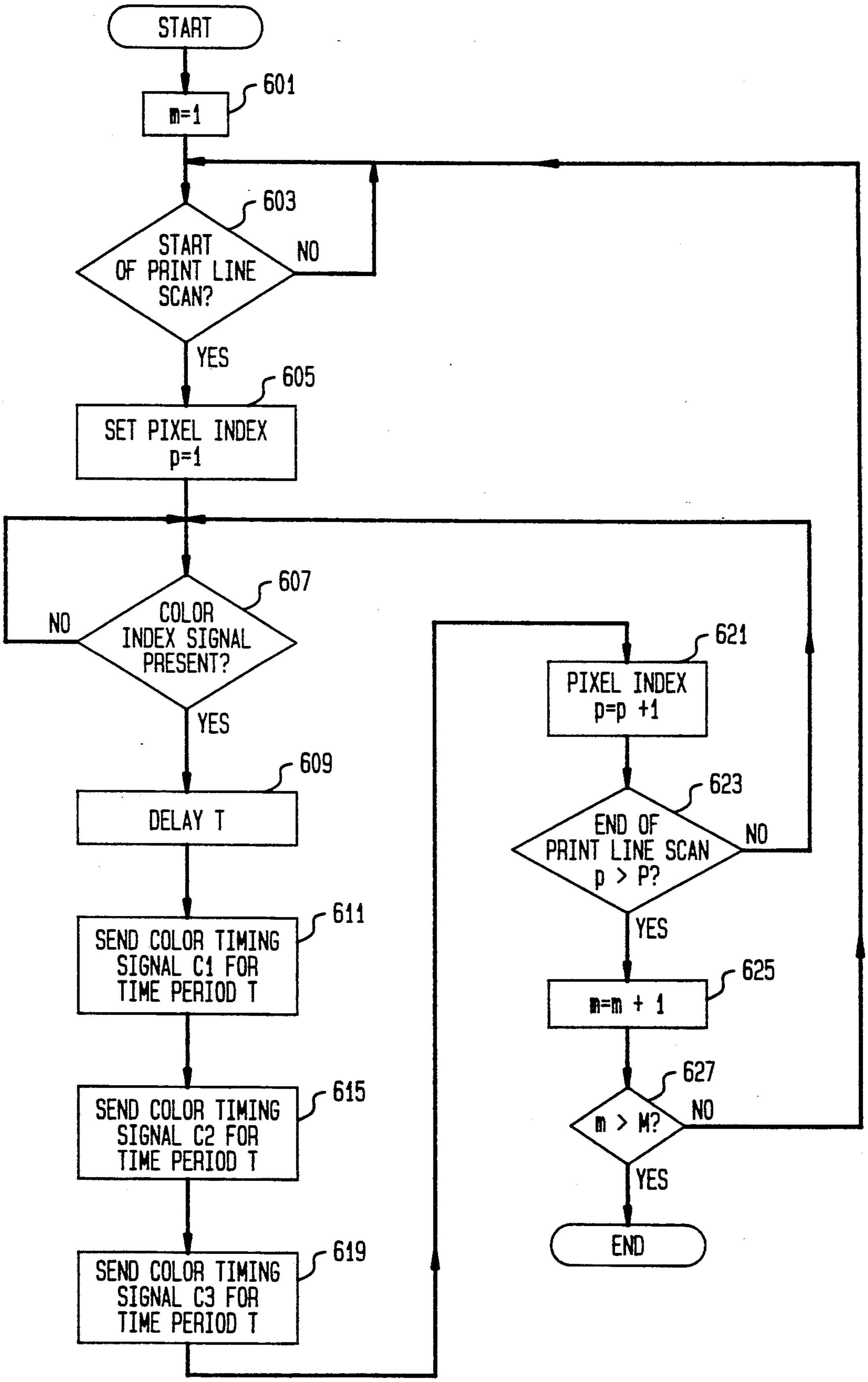
FIG. 6 is a flowchart that illustrates a method of beam scanning that may be used with the arrangement of FIG. 3 in accordance with the present invention.

Referring now to FIG. 6, there is shown a flow chart illustrating the operation of the embodiment 300 in FIG. 3 in printing a scan line. The flow chart comprises a print line index setting step 601, a start of print line decision step 603, a pixel index setting step 605, a color index signal present decision step 607, send color select signal steps 611, 615, and 619, a delay step 609, a pixel index incrementing step 621, an end of print line scan step 623, a print line index incrementing step 625, and an end of print decision step 627. The print line index m is initially set to one in the step 601. Print line scan is started in decision step 603 when a start of print line scan is received by the beam modulation processor 303 from the scanner drive mechanism 30 of FIG. 3 via a line 335. At this time, the scan device 26 is positioned so that the light beam 32 is focused at the left edge of the donor member 200. The pixel index is set to one in the step 605 and the decision step 607 is entered to wait for the presence of an index signal at the output of the light detector 315.

When the indexing signal for the index stripe 206-n1 is generated in the light detector 315, it is applied to the color registration circuit 317. After a T interval (step 609), the step 611 is entered and a C1 (e.g., cyan) color timing pulse (e.g., waveform 503 between times t5 and t6) is formed. The cyan timing pulse is sent to the beam modulation processor 303 via the line 323. In the interval between the times t5 and t6 (i.e., a time period T), the light beam 32 traverses the cyan stripe 206-n2. The cyan beam modulation signal shown in the interval between the times t5 and t6 in waveform 509 is generated in the beam modulation processor 303. The intensity of the light beam 32 during the cyan modulation signal period is set so that the quantity of cyan dye corresponding to the cyan image data signal for the addressed pixel is transferred to the receiver member 14.

After the time period T of the cyan timing pulse step 611, the step 615 is entered in which the magenta timing signal is produced in the color registration circuit 317. The magenta timing signal occurs when the light beam 32 is focused on the magenta stripe 206-n3. The magenta timing signal is supplied to the beam modulation processor 303 via the line 325. This magenta timing signal shown in the waveform 505 between the times t6 and t7 is combined with the magenta image data signal for the addressed pixel in the beam modulation processor 303 to form the magenta beam modulation signal (i.e., M) shown in the waveform 509. The intensity of the light beam 32 during the magenta modulation signal between the times t6 and t7 is thereby set to transfer a quantity of magenta dye corresponding to the magenta image data signal for the pixel.

The step 619, during which the yellow timing signal is produced, is entered from the magenta timing signal step 615. In the interval between the times t7 and t8, the light beam 32 traverses the yellow stripe 206-n4 of the donor member 200 in FIG. 3. The color registration circuit 317 produces the yellow timing pulse shown in the waveform 507 which timing pulse is transferred to the beam modulation processor 303 via the line 327. In the beam modulation processor 303, the yellow image data signal for the addressed pixel is combined with the yellow timing pulse to produce the yellow modulation signal (i.e., Y) shown in the waveform 509 in the period between the times t7 and t8. The yellow modulation signal is applied to the beam former 305. As a result, the intensity of the beam 32 causes a prescribed quantity of yellow corresponding to the yellow image data signal to be transferred to the addressed pixel location on the receiver member 14.

The pixel index incrementing step 621 is entered from the step 619 upon termination of the yellow dye transfer in the step 619 and the pixel index p is incremented to address the next pixel of the print line. Until the pixel index p is greater than the last pixel P of the scan line, the step 607 is reentered from the decision step 623 and the loop from the step 607 to the step 623 is iterated to process the successive pixels of the print line. When the pixel index p is greater than the last pixel P, an end of scan line signal is sent to the scanner drive mechanism 30 from the beam modulation processor 303 via the line 335. The print line index m is incremented in the step 625 and the incremented index m is compared to the last print line M in the decision step 627. If the print line index m is not greater than the last print line M, the step 603 is reentered from the decision step 625 and the processing of the pixels of the next print line is performed in the loop from the step 607 to the step 623.

Figure 7:
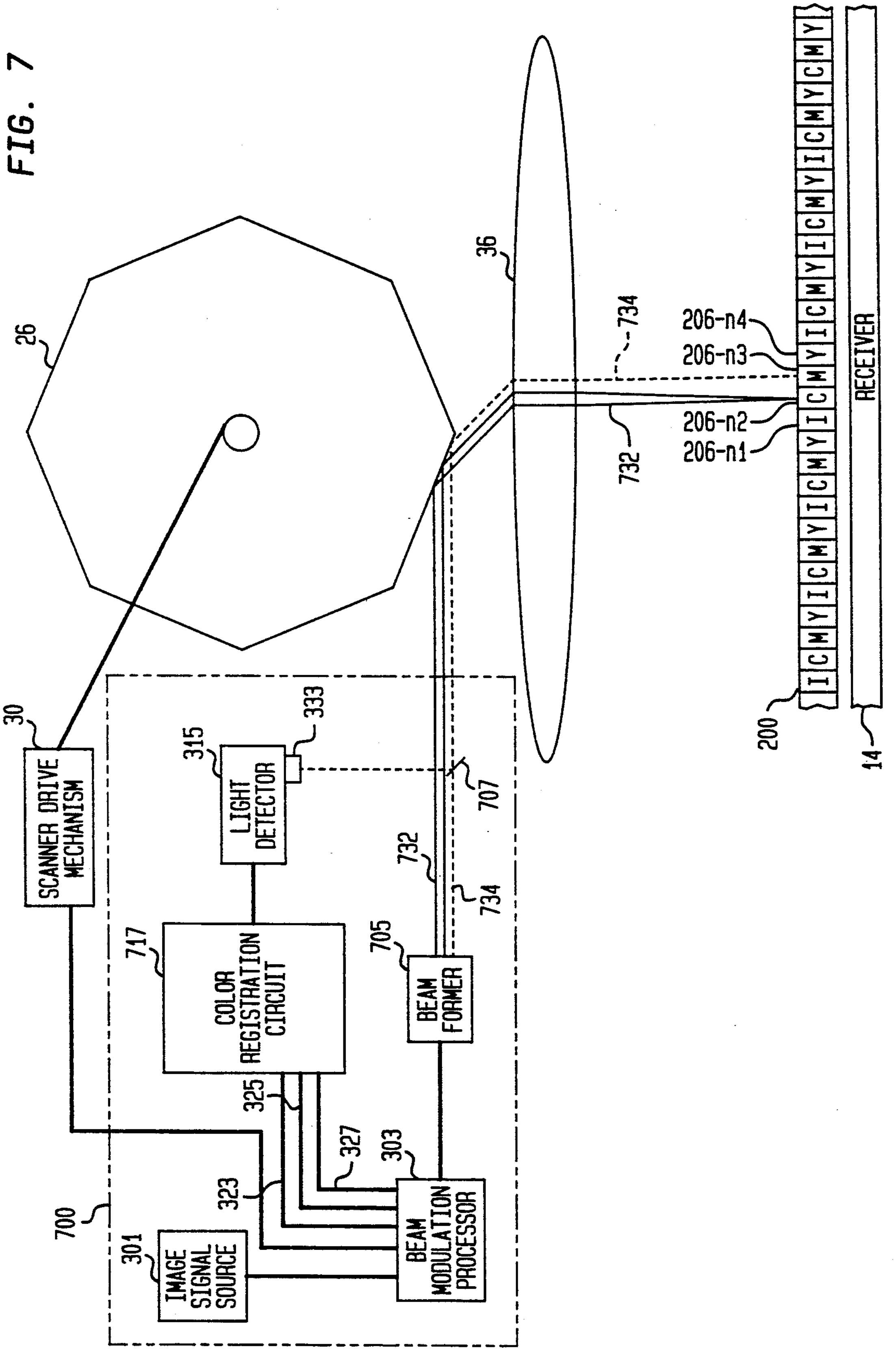
FIG. 7 is a more detailed schematic and block diagram of another embodiment of a beam scanning arrangement in the thermal printer of FIG. 1 in accordance with the invention showing the donor member and receiver in cross-section.

Referring now to FIG. 7, there is shown the scanner drive mechanism 30, the scan device 26, the telecentric focusing lens 36, the donor member 200 described with respect to FIG. 2, the receiver 14 as described with respect to FIG. 1, and an embodiment 700 (shown within a dashed rectangle) of the print beam controller 28 shown in FIG. 1. The embodiment 700 comprises the image signal source 301 of FIG. 3, the beam modulation processor 303 of FIG. 3, a beam former 705, a partial mirror 707, the light detector 315 of FIG. 3, and a color registration circuit 717. As described with respect to FIG. 3, the image source 301 is coupled to a first input of the beam modulator processor 303. A first output terminal of the beam modulator processor 303 is coupled to an input of the beam former 705. A second terminal output of the beam modulation processor 303 is coupled to the scanner drive mechanism 30. The beam former 705 produces a variable intensity light beam 732 and a low intensity interrogating light beam (shown as a dashed line) 734. The light beam 732 appearing at an output of the beam former 705 is coupled to the scan device 26 and therefrom through the telecentric focusing lens 36 to the donor member 200. The light beam 734 is coupled through the partial mirror 707 to the scan device 26 and therefrom through the telecentric focusing lens 36 to the donor member 200. The light receiving input 333 of the light detector 315 receives a reflection of the light beam 734 from the partial mirror 707. As in the embodiment 300 of FIG. 3, an output of the light detector is coupled to an input of the color registration circuit 717. First, second and third timing output terminals of the color registration circuit 717 are coupled to first, second and third timing input terminals of the beam modulation processor 303 via lines 323, 325, and 327.

As described with respect to the embodiment 300 in FIG. 3, image data signals for the successive lines of an image to be printed are generated in the image signal source 301. The beam modulation processor 303 receives the cyan, magenta and yellow image data signals for the pixels of the line to be printed and converts them into a beam modulating signal having the succession of cyan, magenta and yellow beam modulating portions. The beam modulating signal is applied to the beam former 705 wherein the light beam 732 is formed. The intensity of the light beam 732 is modulated by the beam modulating signal from the beam modulator processor 303 as is well known in the art. Each pixel location on the receiver member 14 receives controlled quantities of cyan, magenta and yellow dyes corresponding to the cyan, magenta and yellow image data signals assigned to the pixel whereby the color of the pixel is determined.

The beam former 705 also generates the relatively low intensity interrogating light beam 734. The light beam 734 is insufficient to cause any transfer of dye from the stripes of the donor member 200 to the receiver member 14 in FIG. 7. It is of sufficient intensity, however, to provide reflected light at the light receiving input 333 of the light detector 315 from the index stripes of the donor member 200. The light beam 732 is a writing beam adapted to transfer the dyes of the color stripes of the donor member 200 to the receiver member 14. As illustrated in FIG. 7, the low intensity interrogating beam 734 precedes the writing light beam 732 by one color stripe in the scan of the donor member 200. The partial mirror 707 is arranged to intercept the reflected light from the interrogating beam 734 but not from the writing beam 732.

The operation of the embodiment 700 with respect to the detection of the indexing stripes, the generation of the color timing pulses in the color registration circuit 717, and the forming of the beam modulation signal in the beam modulation processor 303 is substantially similar to that described with respect to the embodiment 300 in FIG. 3. The writing beam 732, however, does not function as an interrogating beam as does the light beam 32 in the embodiment 300. The interrogating beam 734 in FIG. 7 leads the dye transfer beam 732 by one color stripe. The interrogating beam 734 of FIG. 7 is shown impinging on the magenta stripe 206-n3 while the dye transfer beam 732 of FIG. 7 impinges on the cyan stripe 206-n2. When an index stripe is detected by the light detector 315, the index signal therefrom is used in the same manner described in the flow chart of FIG. 3 except that the sequence of color stripe timing signals is altered.

Figure 8:
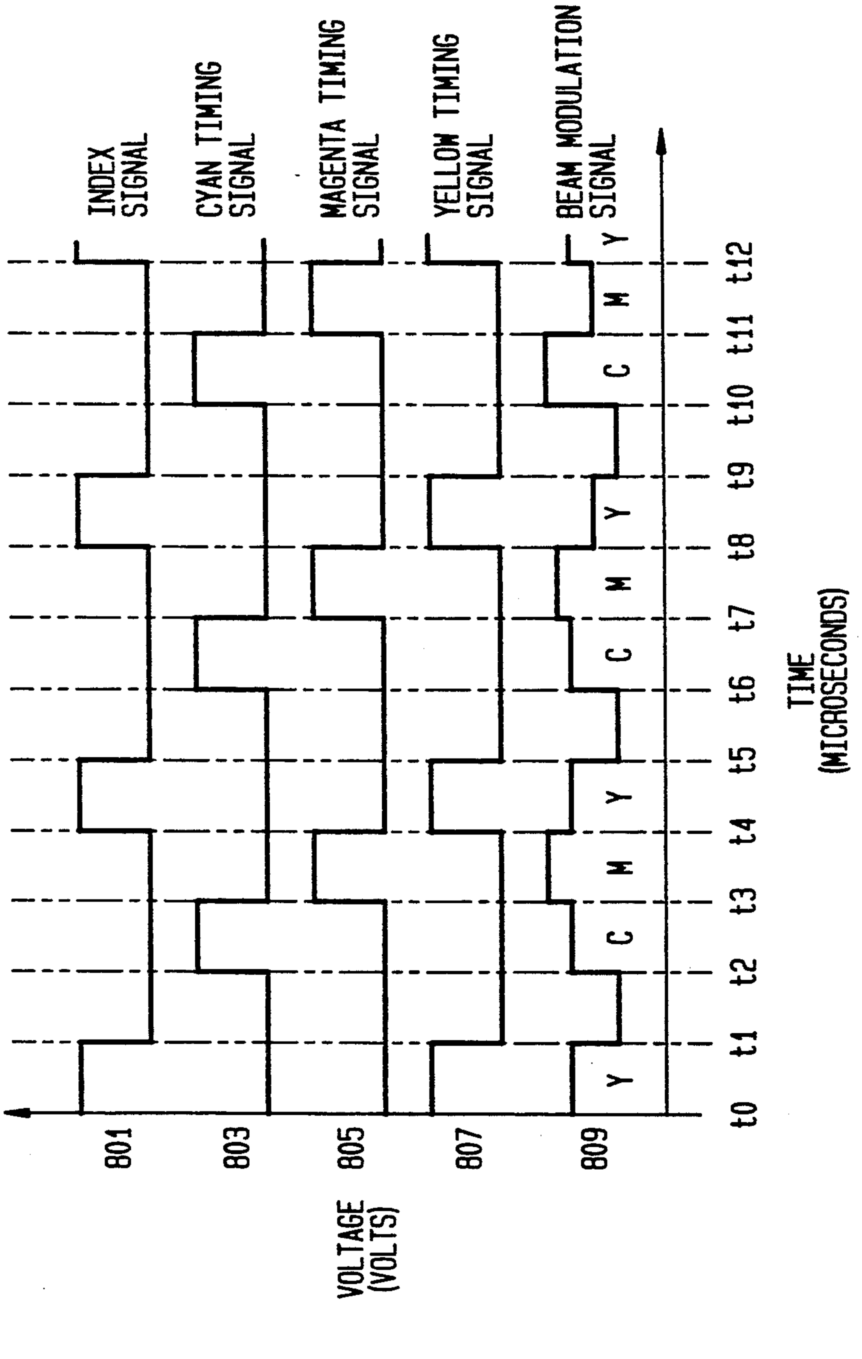
FIG. 8 shows waveforms useful in illustrating the operation of the embodiment of the invention shown in FIG. 7.

Referring now to FIG. 8, there are shown graphically pulse waveforms (volts) as a function of Time (microseconds) illustrating the indexing signals from the light detector 315, the color registration timing signals from the color registration circuit 717, and the beam modulation signal from the beam modulation processor 303 in the embodiment 700 of FIG. 7. For purposes of illustration, the magnitudes of the waveforms are shown as uniform. A waveform 801 shows the indexing signals at the output of the light detector 315. Waveforms 803, 805, and 807 show the cyan timing pulses, the magenta timing pulses, and the yellow timing pulses, respectively, on lines 323, 325 and 327 which are coupled to the timing inputs of the beam modulation processor 303. A waveform 809 shows the beam modulation signal output of the beam modulation processor 303.

As described with respect to FIG. 3, the indexing signals in the waveform 801 occur at regular intervals (e.g., between times t0 and t1, t4 and t5, and t8 and t9) when the light beams 732 and 734 scan across the donor member 200 in the embodiment 700. For purposes of illustration, consider the scan of the stripes 206-n1, 206-n2, 206-n3, and 206-n4 in FIG. 7. These stripes are over a pixel location n in the receiver member 14 of FIG. 7. The waveforms in FIG. 8 corresponding to these stripes may, for example, extend from time t4 to t8. The intensity of the interrogating light beam 734 is held at a sufficient level to reflect from the indexing stripe 206-n1 but not from the color stripes 206-n2, 206-n3 and 206-n4. The intensity of the interrogating beam 734 is insufficient to cause dye transfer where it is scanning the color stripes. The intensity of the writing light beam 732 is modulated by the cyan, magenta, and yellow image data signals in the intervals when the beam 732 impinges on the cyan, magenta, and yellow stripe intervals, respectively.

The light from the interrogating beam reflected from the index stripe 206-n1 exceeds the predetermined threshold of the light detector 315 and produces the positive indexing pulse signal between times t4 and t5 in the waveform 801. The color registration circuit 717 receives the indexing pulse signal during the time period when the yellow timing signal corresponding to the yellow stripe to the left of the index stripe 206-n1 in FIG. 7 is present as shown in the waveform 807. The color registration circuit then successively generates a cyan timing pulse corresponding to the cyan stripe 206-n2 in the interval between times t6 and t7 (waveform 803), a magenta timing pulse corresponding to the magenta stripe 206-n3 between times t7 and t8 (waveform 805), and a yellow timing pulse corresponding to the yellow stripe 206-n4 between times t8 and t9 (waveform 807).

Referring again to FIG. 4, the color registration circuit 717 in FIG. 7 may comprise the embodiment 400 described with respect to FIG. 4. The frequency divider 409 and the shift register 411 of FIG. 4, however, are modified to provide the timing pulse waveforms illustrated in FIG. 8. The frequency divider 409 is a ¼ divider and the shift register 411 is a four stage shift register.

Figure 14:
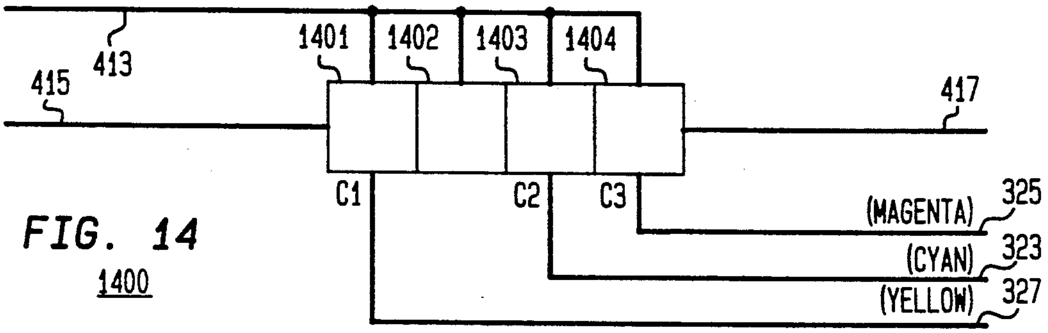
FIG. 14 is a more detailed block diagram of an embodiment of a shift register adapted for use in the color registration circuit of the embodiment of FIG. 7 with the donor member shown in FIG. 2.

Referring now to FIG. 14, there is shown a more detailed block diagram of an embodiment 1400 of the shift register 411 of FIG. 4 that may be used in the embodiment 700 of FIG. 7. The shift register embodiment 1400 comprises four shift register stages 1401, 1402, 1403, and 1404. A data input of the shift register 1400 is coupled to the line 415 which is further coupled to the frequency divider 409 via the AND gate 419 in FIG. 4. A shift input of each of the shift register stages 1401, 1402, 1403, and 1404 is coupled to a shift line 413 which is further coupled to the output of the voltage controlled oscillator 407 in FIG. 4. An output of the shift register stage 1401 is coupled to the timing signal line 327. An output of the shift register stage 1403 is coupled to the timing signal line 323 and a first output of the shift register stage 1404 is coupled to timing signal line 325. A second output of the shift register stage 1404 is coupled to a line 417 which is further coupled to the second input of the phase detector 403.

In operation, the shift register stage 1401 receives data pulses from the frequency divider 409 via the AND gate 419 and the line 415. All the shift register stages receive shift pulses from the voltage controlled oscillator 407. The shift pulses transfer the data pulses in each stage to the succeeding stage once every T seconds. The yellow timing pulse on the line 327 is obtained from the stage 1401 in the first T second time period (e.g., between times t4 and t5 in the waveform 803). The cyan timing pulse on the line 323 is obtained in the third T time period from the stage 1403 (e.g., between times t6 and t7 in the waveform 805) and the magenta timing pulse on the line 325 is obtained in the fourth T second time period from the stage 1404 (e.g., between times t7 and t8 in the waveform 805).

The beam modulation processor 303 combines the yellow image data signal from the image signal source 301 with the yellow beam timing pulse on the line 327 to form the beam modulating pulse shown in the waveform 809 between the times t4 and t5. In similar fashion, the beam modulation processor 303 combines the cyan image data signal from the image signal source 301 with the cyan beam timing pulse on the line 323 to form the cyan portion of the beam modulating pulse shown in the waveform 809 in the interval between the times t6 and t7 and the beam modulation processor combines the magenta image data signal from the image signal source 301 with the magenta beam timing pulse on the line 325 to form the magenta portion of the beam modulating pulse shown in the waveform 809 in the interval between the times t7 and t8. The beam modulating pulse causes successive cyan, magenta, and yellow dye transfers to the addressed pixel location. As described with respect to FIG. 3, accurate color registration is maintained and the successive pixels of the color image are printed in a single pass of the scan beam.

Figure 9:
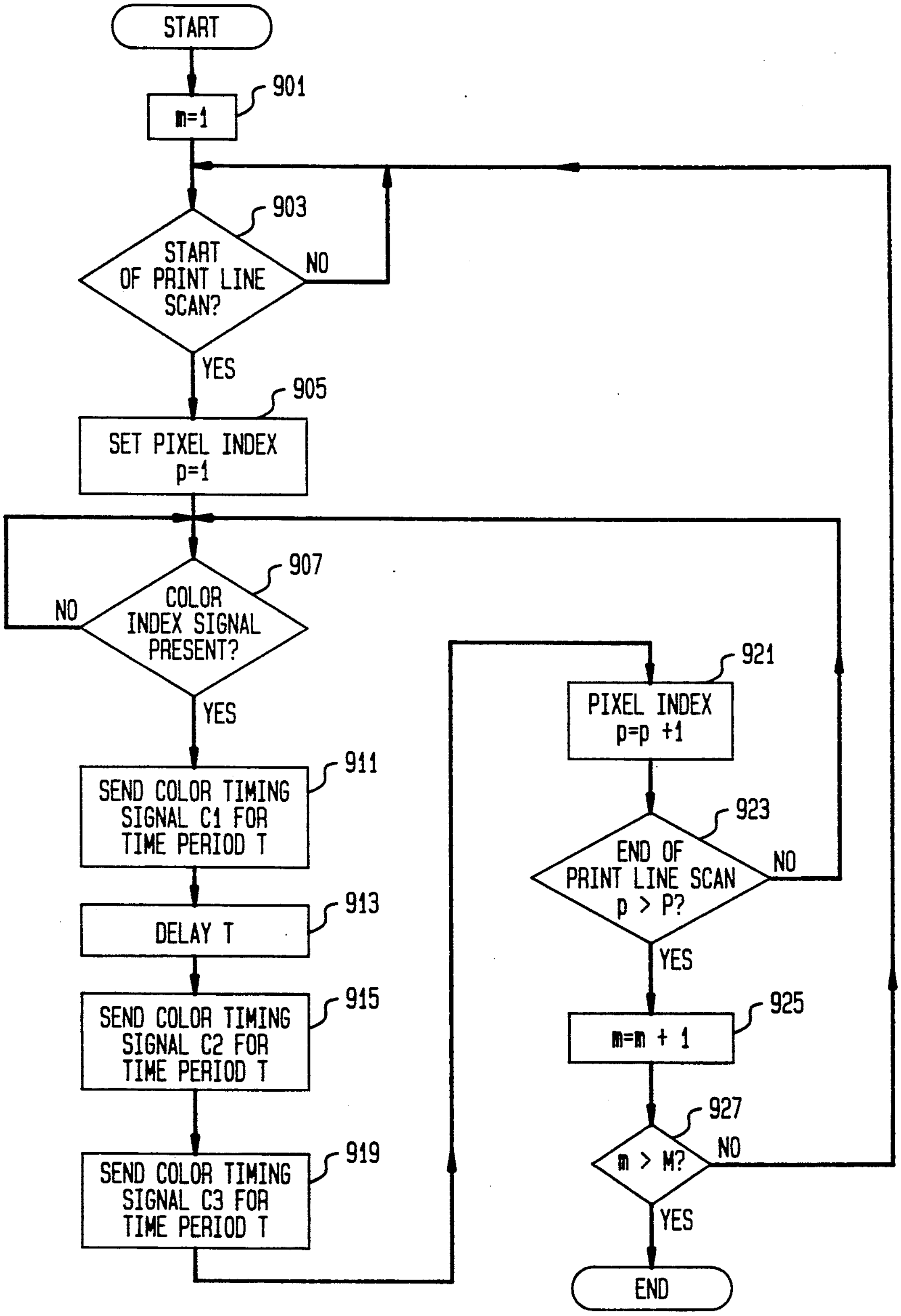
FIG. 9 is a flowchart that illustrates a method of beam scanning that may be used with the arrangement of FIG. 7 in accordance with the present invention.

Referring now to FIG. 9, there is shown a flow chart illustrating the operation of the embodiment 700 in FIG. 7 in printing a scan line. The flow chart comprises a print line index setting step 901, a start of print line decision step 903, a pixel index setting step 905, a color index signal present decision step 907, send color select signal steps 911, 915, and 919, a delay step 913, a pixel index incrementing step 921, an end of print line scan step 923, a print line index incrementing step 925, and an end of print step 927. The print line index m is initially set to one in the step 901. Print line scan is started in decision step 903 when a start of print line scan is received from the scanner drive mechanism 30 of FIG. 7. At this time, the scan device 26 is positioned so that the light beam 734 is focused at the left edge of the donor member 200. The pixel index is set to one in the step 905 and the decision step 907 is entered to wait for the presence of an index signal at the output of the light detector 315.

When the indexing signal for the index stripe 206-n1 is generated in the light detector 315, it is applied to the color registration circuit 717. The step 911 is entered and a C1 (e.g., yellow) color timing pulse (e.g., waveform 807 between times t4 and t5) corresponding to the yellow stripe to the left of the index strip 206-n1 is formed. The yellow timing pulse is sent to the beam modulation processor 303 via the line 327. In the interval between the times t4 and t5 (i.e., a time period T), the interrogating beam 734 traverses the index stripe 206-n1 and the writing light beam 732 traverses the yellow stripe to the left of the index stripe 206-n1. The yellow beam modulation signal shown in the interval between the times t4 and t5 in waveform 809 is generated in the beam modulation processor 303. The intensity of the writing light beam 732 during the yellow modulation period is set so that the quantity of yellow dye corresponding to the yellow image signal for the previously addressed pixel is transferred to the receiver member 14.

After the time period T of the step 911, there is a delay period T between times t5 and t6 in the step 913 during which the writing beam 732 impinges on the index stripe 206-n1. The step 915 is then entered in which the C2 (cyan) timing signal (e.g., corresponding to the cyan stripe 206-n2) is produced in the color registration circuit 317. The cyan timing signal occurs when the writing light beam 732 is focused on the cyan stripe 206-n2 and is supplied to the beam modulation processor 303 via the line 323. This cyan timing signal shown in the waveform 803 between the times t6 and t7 is combined with the cyan image data signal for the addressed pixel in the beam modulation processor 303 to form the cyan beam modulation shown in the waveform 809. The intensity of the writing light beam 732 during the cyan modulation between the times t6 and t7 is thereby set to transfer a quantity of cyan dye corresponding to the cyan image data signal for the pixel.

The step 919 during which the C3 (magenta) timing signal is produced is entered from the step 915. In the interval between the times t7 and t8, the writing light beam 732 traverses the magenta stripe 206-n3 of the donor member 200 and the interrogating light beam 734 traverses the yellow stripe 206-n4 in FIG. 7. The color registration circuit 717 produces the magenta timing pulse shown in the waveform 805 which timing pulse is transferred to the beam modulation processor 303 via the line 325. In the beam modulation processor 303, the magenta image data signal for the addressed pixel is combined with the magenta timing pulse to produce the magenta modulation signal shown in the waveform 809 in the time between the times t7 and t8. The magenta modulation is applied to the beam former 705. As a result of the magenta modulation, the intensity of the beam 732 causes a prescribed quantity of magenta dye corresponding to the magenta image data signal to be transferred to the addressed pixel location on the receiver member 14.

The pixel index step 921 is entered from the step 919 upon termination of the magenta dye transfer in the step 919 and the pixel index p is incremented to address the next pixel of the print line. Until the pixel index p is greater than the last pixel P of the scan line, the step 907 is reentered from the decision step 923 and the loop from the step 907 to the step 923 is iterated to process the successive pixels of the print line. When the pixel index p is greater than the last pixel P, an end of scan line signal is sent from the beam modulation processor to the scanner drive mechanism 30. The print line index m is incremented in the step 925 and the incremented index m is compared to the last print line M in the decision step 927. If the print line index m is not greater than the last print line M, the step 903 is reentered from the decision step 927 and the processing of the pixels of the next print line is performed in the loop from the step 907 to the step 923.

Figure 10:
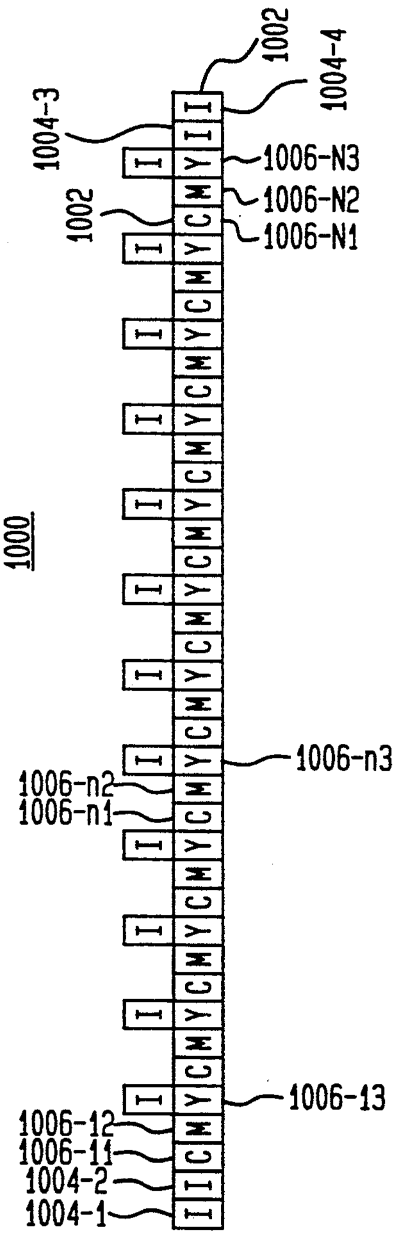
FIG. 10 shows an alternative donor member structure that may be used in the thermal printer of FIG. 1 in accordance with the present invention.

Referring now to FIG. 10, there is shown a cross section view of an alternate embodiment 1000 of the donor member 16 of FIG. 1. The donor member embodiment 1000 comprises a sheet 1002 that is partitioned into narrow stripes 1004-1, 1004-2, 1006-11, 1006-12, 1006-13, . . . , 1006-n1, 1006-n2. 1006-n3, . . . , 1006-N1, 1006-N2, 1006-N3, 1004-3, and 1004-4. The stripes 1006-11, 1006-12, 1006-13 through 1006-N1, 1006-N2, 1006-N3, are arranged in a repeated sequence of a cyan, a magenta, and a yellow-reflective index stripe across the donor member in the direction of the scan. Each stripe extends along the donor member in the direction perpendicular to the scan. The stripe sequence 1006-11, 1006-12 and 1006-13 comprises a cyan stripe having a cyan dye component and a heat absorbing component, a magenta stripe having a magenta dye component and a heat absorbing component, and a yellow-reflective index stripe having a yellow dye component, a heat absorbing component and a reflective component for use in indexing the stripe pattern. This stripe pattern is repeated across the donor member 16 until the stripe sequence 1006-N1, 1006-N2, and 1006-N3. End stripes 1004-1, 1004-2, 1004-3 and 1004-4 are index stripes which define the edges of the donor member in the scanning direction.

The widths of the stripes in one set of stripes (e.g., 1006-n1, 1006-n2, and 1006-n3) in the donor member 16 are selected to supply any combination of cyan, magenta and yellow dyes to a single pixel location on the receiver member 14. In operation, the light beam scan is synchronized to the stripe pattern by reflections from the successive reflective stripes. The yellow stripes in the donor member 1000 are altered to include a reflective component. In this way, the separate reflective index stripes of the embodiment 200 shown in FIG. 2 are eliminated. Since the dye transfer characteristics of the yellow stripes are changed by the inclusion of a reflective component, the yellow modulation portions of the modulated beam are adjusted to provide proper dye transfer in the presence of the reflective material. The reflective component of the yellow stripes in the embodiment 1000 is indicated by the rectangles labeled I above the rectangles labeled y. When the donor member 1000 replaces the donor member 200 in FIG. 3, the modulation signal from the beam modulation processor 303 is synchronized to the scanning beam by the reflections from the successive yellow-reflective dye stripes. The beam is synchronized to be successively modulated by the cyan pixel data, the magenta pixel data and the yellow pixel data so that accurate color registration is achieved. In this way, each pixel receives the combination of cyan, magenta and yellow dyes required by the image data signals as it scans across the donor member.

Figure 11:
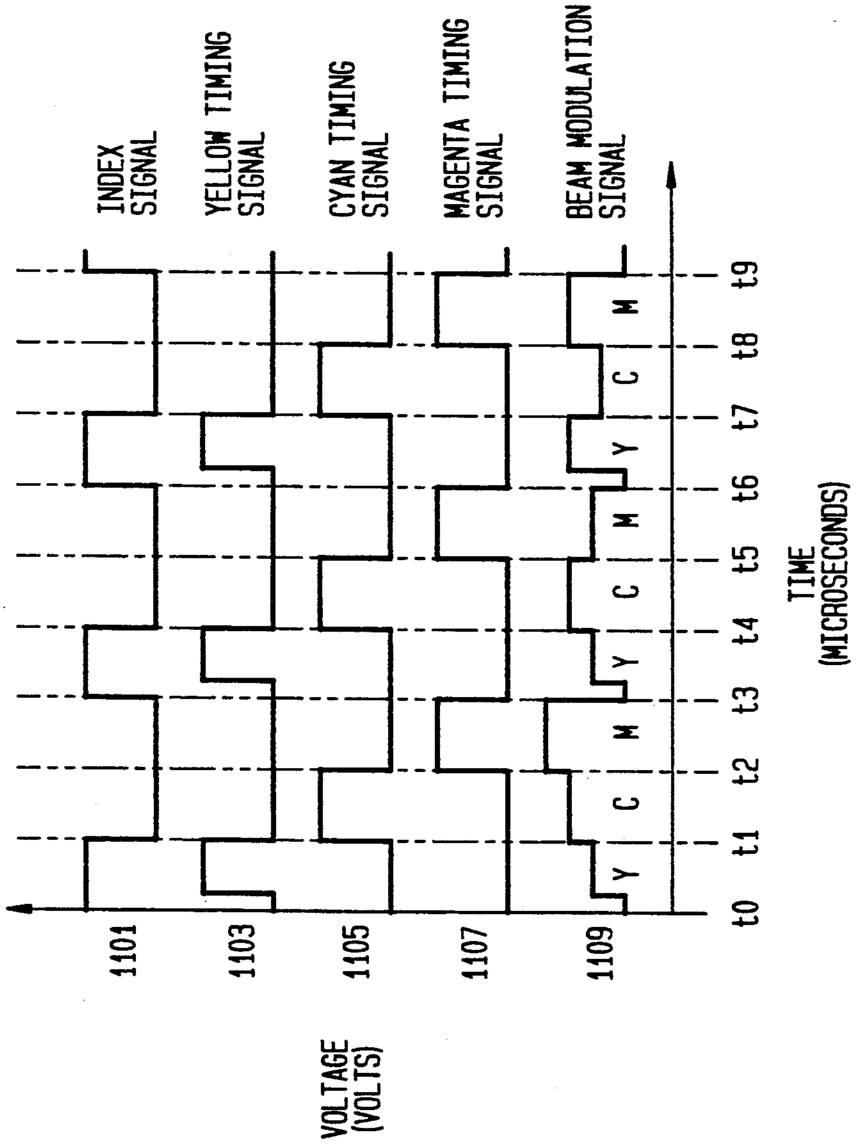
FIG. 11 shows waveforms useful in illustrating the operation of the embodiment of the invention shown in FIG. 3 with the alternative donor member of FIG. 10.

Referring now to FIG. 11, there are shown graphically pulse waveforms (volts) as a function of Time (microseconds) illustrating a plurality of the indexing signals, the corresponding yellow, cyan and magenta timing signals, and the corresponding beam modulation signal obtained when the donor member 200 is replaced by the donor member 1000 in the circuit of FIG. 3. A waveform 1101 shows a succession of indexing signals obtained from reflections from the yellow dye stripes as the light beam scans across the stripe pattern of the donor member. A waveform 1103 shows the yellow timing signals formed in the color registration circuit 317 of FIG. 3. A waveform 1105 shows the cyan timing signals formed in the color registration circuit 317 of FIG. 3 and a waveform 1107 shows the magenta timing signals formed in the color registration circuit 317 of FIG. 3. A waveform 1109 shows the beam modulation signal obtained from the beam modulation processor 303.

Referring again to FIG. 4, The color registration circuit 317 in FIG. 3 may comprise the embodiment 400 described with respect to FIG. 4. The frequency divider 409 and the shift register 411 of FIG. 4, however, are modified to provide the timing pulse waveforms illustrated in FIG. 11. Since there are three successive color stripes in each color pattern and one light beam 32 is used both for interrogation and dye transfer, a period of T/4 in the yellow timing period is reserved for interrogation. During the T/4 interrogation period, the modulating beam is held at a low intensity level. For the timing of FIG. 11, the frequency divider 409 is a 1/12 divider and the shift register 411 is a twelve stage shift register.

Figure 15:
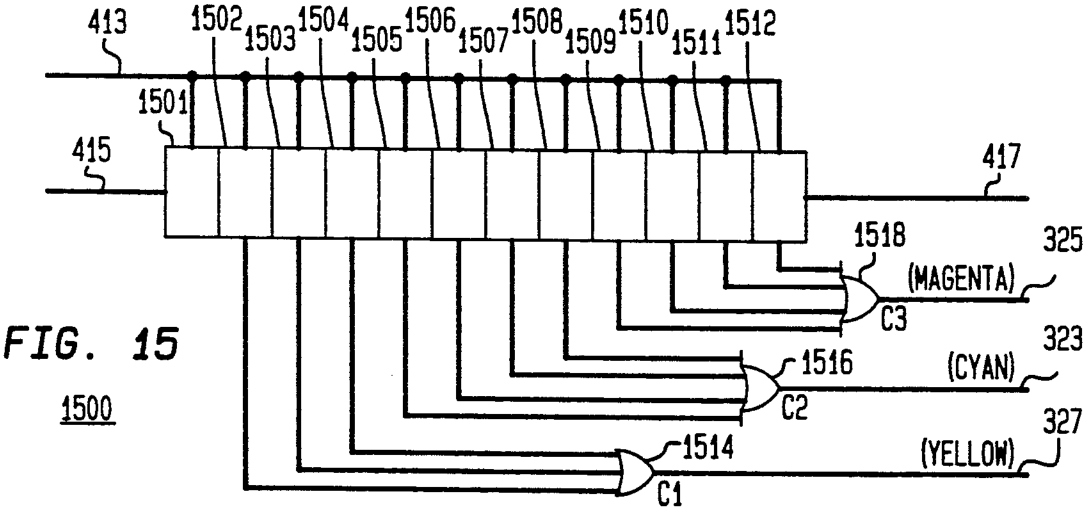
FIG. 15 is a more detailed block diagram of an embodiment of a shift register adapted for use in the color registration circuit of the embodiment of FIG. 3 with the donor member shown in FIG. 10.

Referring now to FIG. 15, there is shown a more detailed block diagram of an embodiment 1500 of the shift register 411 of FIG. 4. The shift register embodiment 1500 comprises shift register stages 1501, 1502, . . . , 1512, and OR gates 1514, 1516, and 1518. A data input of the shift register stage 1501 is coupled to the line 415 which is further coupled to the frequency divider 409 via AND gate 419 in FIG. 4. A shift input of each of the shift register stages 1501 through 1512 is coupled to a shift line 413 which is further coupled to the output of the voltage controlled oscillator 407 in FIG. 4. Outputs of the shift register stages 1502, 1503, and 1504 are coupled to first, second and third inputs of the OR gate 1514. An output of the OR gate 1514 is coupled to the yellow timing signal line 327. Outputs of the shift register stages 1505, 1506, 1507, and 1508 are coupled to first, second, third, and fourth inputs, respectively, of the OR gate 1516. An output of the OR gate 1516 is coupled to the cyan timing signal line 323. Outputs of the shift register stages 1509, 1510, 1511, and 1512 are coupled to the first, second, third, and fourth inputs of the OR gate 1518. The output of the OR gate 1518 is coupled to the magenta timing signal line 325. Another output of the shift register stage 1512 is coupled to the line 417 which is further coupled to the second input of the phase detector 403.

In operation, the shift register stage 1501 receives data pulses from the frequency divider 409 via the AND gate 419 and the line 415. Each shift register stage receives shift pulses from the voltage controlled oscillator 407. The shift pulses transfer the data pulses in each stage to the succeeding stage once every T/4 seconds. The first T/4 time period just prior to the yellow timing pulse is an interrogation time period during which the light beam intensity is reduced below the dye transfer level. The yellow timing pulse on the line 327 is obtained from stages 1502, 1503, and 1504 through OR gate 1514 in the second, third and fourth T/4 time periods. The cyan timing pulse on the line 323 is obtained in the fifth, sixth, seventh and eighth T/4 time periods from the stages 1505, 1506, 1507, and 1508 via the OR gate 1516. The magenta timing pulse on the line 325 is obtained in the ninth, tenth, eleventh, and twelfth T/4 time periods from the stages 1509, 1510, 1511, and 1512 via the OR gate 1518.

The circuit of FIG. 3 utilizes a single beam to detect the presence of a reflective stripe and to heat the donor member to effect color dye transfer to the receiver. As described with respect to FIG. 3, light beam intensity in the index stripe time period is maintained at a level insufficient to cause dye transfer but sufficient to provide a reflected beam to the light detector 315. Since the reflections occur when the beam impinges on the yellow color stripe of the donor member 1000, the yellow timing signal (waveform 1103 of FIG. 11) is generated in the latter 3T/4 portion of the index signal time period (e.g., between times t0 and t1 in FIG. 11). The cyan timing signal occurs in the next successive T interval (e.g., between times t1 and t2 of FIG. 11) and the magenta timing signal occurs in the interval T following the cyan timing pulse interval (e.g., between times t2 and t3 of FIG. 11). The pulse pattern is repeated in the intervals between times t3 and t6 and between times t6 and t9.

The donor member 1000 may replace the donor member 200 in the circuit of FIG. 7. In such an arrangement, an interrogating light beam 734 and a dye transfer light beam 732 are used. The interrogating light beam 734 precedes the dye transfer light beam 732 by one color stripe. As a result the color registration circuit 717 must be modified to change the color timing signal sequence.

Figure 12:
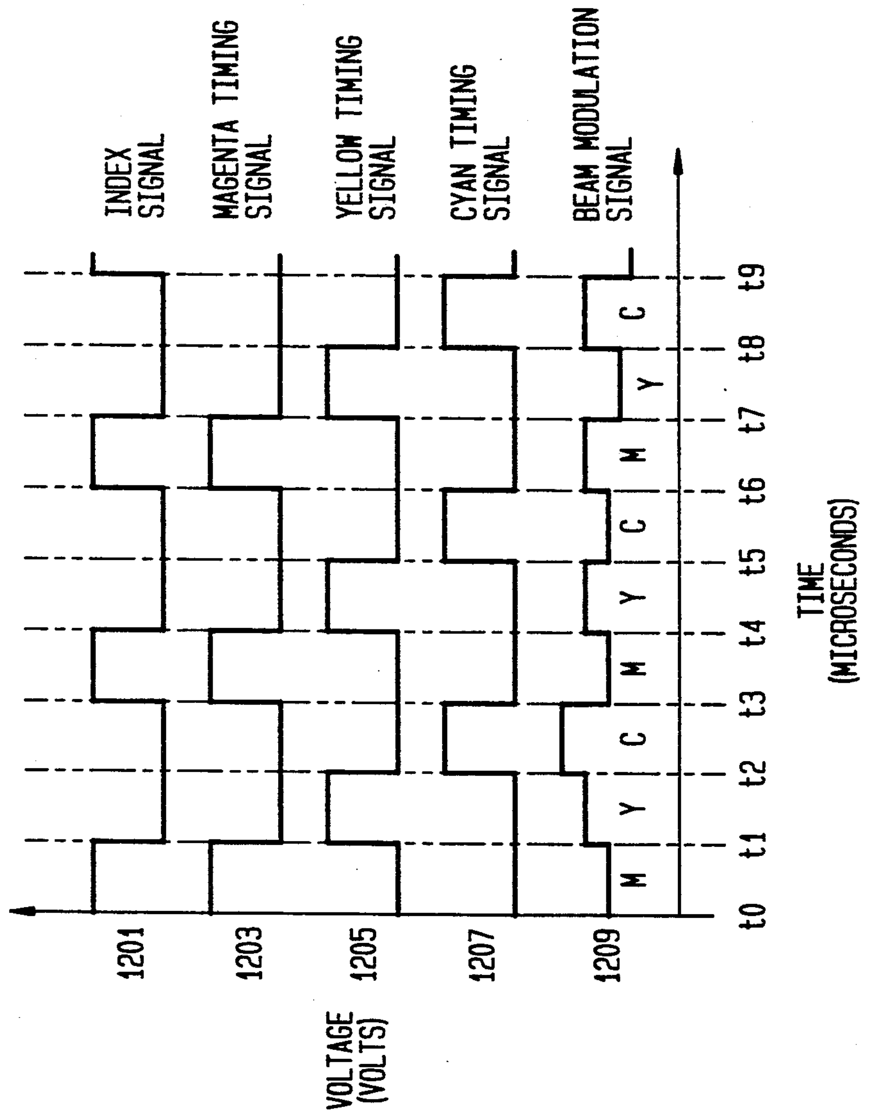
FIG. 12 shows waveforms useful in illustrating the operation of the embodiment of the invention shown in FIG. 7 with the alternative donor member of FIG. 10.

Referring now to FIG. 12, there are shown graphically pulse waveforms (volts) as a function of Time (microseconds) illustrating a plurality of the indexing signals, the corresponding yellow, cyan and magenta timing signals, and the corresponding beam modulation signal obtained when the donor member 200 is replaced by the donor member 1000 in the embodiment 700 of the circuit of FIG. 7. A waveform 1201 shows a succession of indexing signals obtained from reflections from the yellow-reflective dye stripes as the light beam scans across the stripe pattern of the donor member. A waveform 1203 shows the magenta timing signals formed in the color registration circuit 717 of FIG. 7. A waveform 1205 shows the yellow timing signals formed in the color registration circuit 717 of FIG. 7 and a waveform 1207 shows the cyan timing signals formed in the color registration circuit 717 of FIG. 7. A waveform 1209 shows the beam modulation signal obtained from the beam modulation processor 303.

The circuit of FIG. 7 utilizes the low intensity interrogating beam 734 to detect the presence of a reflective stripe and the image data signal modulated light beam 732 to heat the donor member to effect color dye transfer to the receiver. As described with respect to FIG. 7, dye transfer takes place over the entire color timing signal interval T. The reflections from the yellow stripes of the donor member 1000 occur while the modulated light beam 732 impinges on the adjacent magenta stripe. Consequently, the magenta timing signals (waveform 1203) occur in the index signal time periods (e.g., between times t0 and t1 in FIG. 12). The yellow timing signals (waveform 1205) are generated in the next successive time periods (e.g., between times t1 and t2). The cyan timing signal occurs the next successive interval (e.g., between times t2 and t3). The pulse pattern is repeated in the intervals between times t3 and t6 and between times t6 and t9.

Referring again to FIG. 4, The color registration circuit 717 in FIG. 7 may comprise the embodiment 400 described with respect to FIG. 4. The frequency divider 409 and the shift register 411 of FIG. 4, however, are modified to provide the timing pulse waveforms illustrated in FIG. 12. Since there is no time period set aside for interrogation, the frequency divider 409 is a ⅓ divider and the shift register 411 is a three stage shift register.

Figure 16:
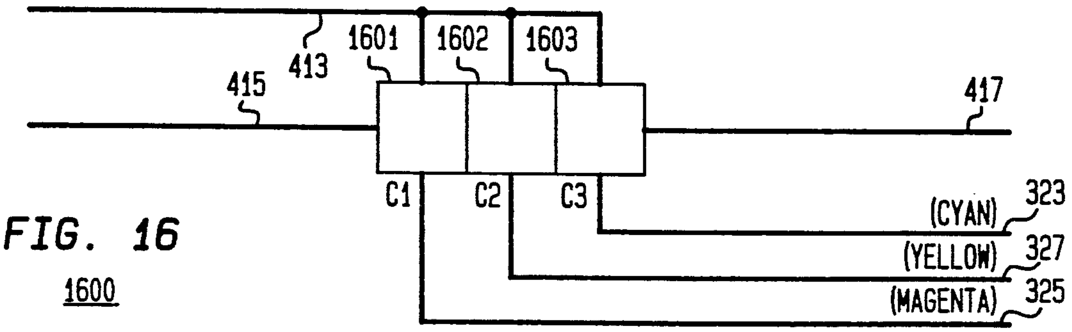
FIG. 16 is a more detailed block diagram of an embodiment of a shift register adapted for use in the color registration circuit of the embodiment of FIG. 7 with the donor member shown in FIG. 10.

Referring now to FIG. 16, there is shown a more detailed block diagram of an embodiment 1600 of the shift register 411 of FIG. 4. The shift register embodiment comprises shift register stages 1601, 1602, and 1603. A data input of the shift register stage 1601 is coupled to the line 415 which is further coupled to the frequency divider 409 via AND gate 419 in FIG. 4. A shift input of each of the shift register stages 1601, 1602, and 1603 is coupled to a shift line 413 which is further coupled to the output of the voltage controlled oscillator 407 in FIG. 4. An output of the shift register stage 1601 is coupled to the timing signal line 325. An output of the shift register stage 1602 is coupled to the timing signal line 327 and a first output of the shift register stage 1603 is coupled to timing signal line 323. A second output of the shift register stage 1603 is coupled to a line 417 which is further coupled to the second input of the phase detector 403 in FIG. 4.

In operation, the shift register stage 1601 receives data pulses from the frequency divider 409 via the AND gate 419 and the line 415. All the shift register stages receive shift pulses from the voltage controlled oscillator 407. The shift pulses transfer the data pulses in each stage to the succeeding stage once every T seconds. The magenta timing pulse on the line 325 is obtained from the stage 1601 in the first T second time period. The yellow timing pulse on the line 327 is obtained in the second T time period from the stage 1602 and the cyan timing pulse on the line 323 is obtained in the third T second time period from the stage 1603.

Figure 17:
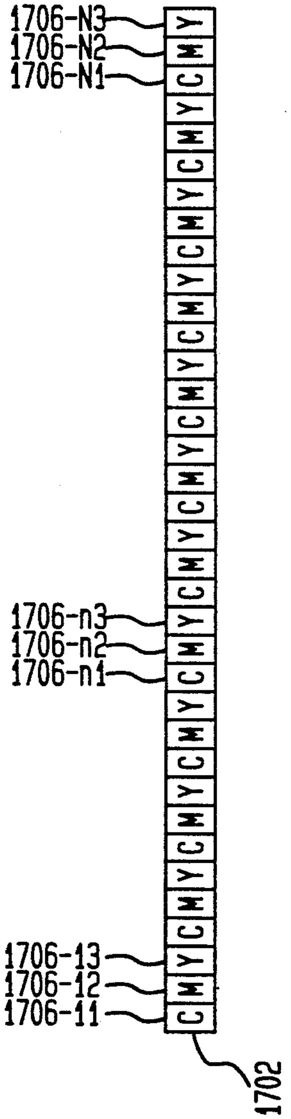
FIG. 17 shows another alternative donor member structure that may be used in the thermal printer of FIG. 1 in accordance with the present invention.

Referring now to FIG. 17, there is shown a cross section view of an alternate embodiment 1700 of the donor member 16 of FIG. 1. The donor member embodiment 1700 comprises a sheet 1702 that is partitioned into narrow stripes 1706-11, 1706-12, 1706-13, . . . , 1706-n1, 1706-n2, 1706-n3. . . , 1706-N1, 1706-N2, 1706-N3. The stripes 1706-11, 1706-12, 1706-13 through 1706-N1, 1706-N2, and 1706-N3 are arranged in a repeated sequence of a cyan, a magenta, and a yellow index stripe across the width of the donor member (i.e., the direction of the scan). Each stripe extends along the length of the donor member in the direction perpendicular to the scan. The stripe sequence 1706-11, 1706-12 and 1706-13 comprises a cyan stripe having a cyan dye component and a heat absorbing component, a magenta stripe having a magenta dye component and a heat absorbing component, and a yellow stripe having a yellow dye component and a heat absorbing component. This stripe pattern is repeated across the donor member 16 until the stripe sequence 1706-N1, 1706-N2, and 1706-N3.

The widths of the stripes in one set of stripes (e.g., 1706-n1, 1706-n2, and 1706-n3) in the donor member 16 are selected to supply any combination of cyan, magenta and yellow dyes to a single pixel location on the receiver member 14. In operation, the light beam scan is synchronized to the stripe pattern by reflections from the successive stripes. In this way, the separate reflective index stripes of the embodiment 200 shown in FIG. 2 are eliminated. When the donor member 1700 replaces the donor member 200 in a thermal printer such as shown in FIG. 7, the modulation signal from the beam modulation processor 303 is synchronized to the scanning by the reflections from the successive dye stripes. This is done by providing a separate broad spectrum light beam to interrogate the color stripe pattern. The modulated light beam is thereby synchronized to the successive cyan stripes, the magenta stripes and the yellow stripes so that accurate color registration is achieved. In this way, each pixel receives the combination of cyan, magenta and yellow dyes required by the image data signals as it scans across the donor member.

Figure 18:
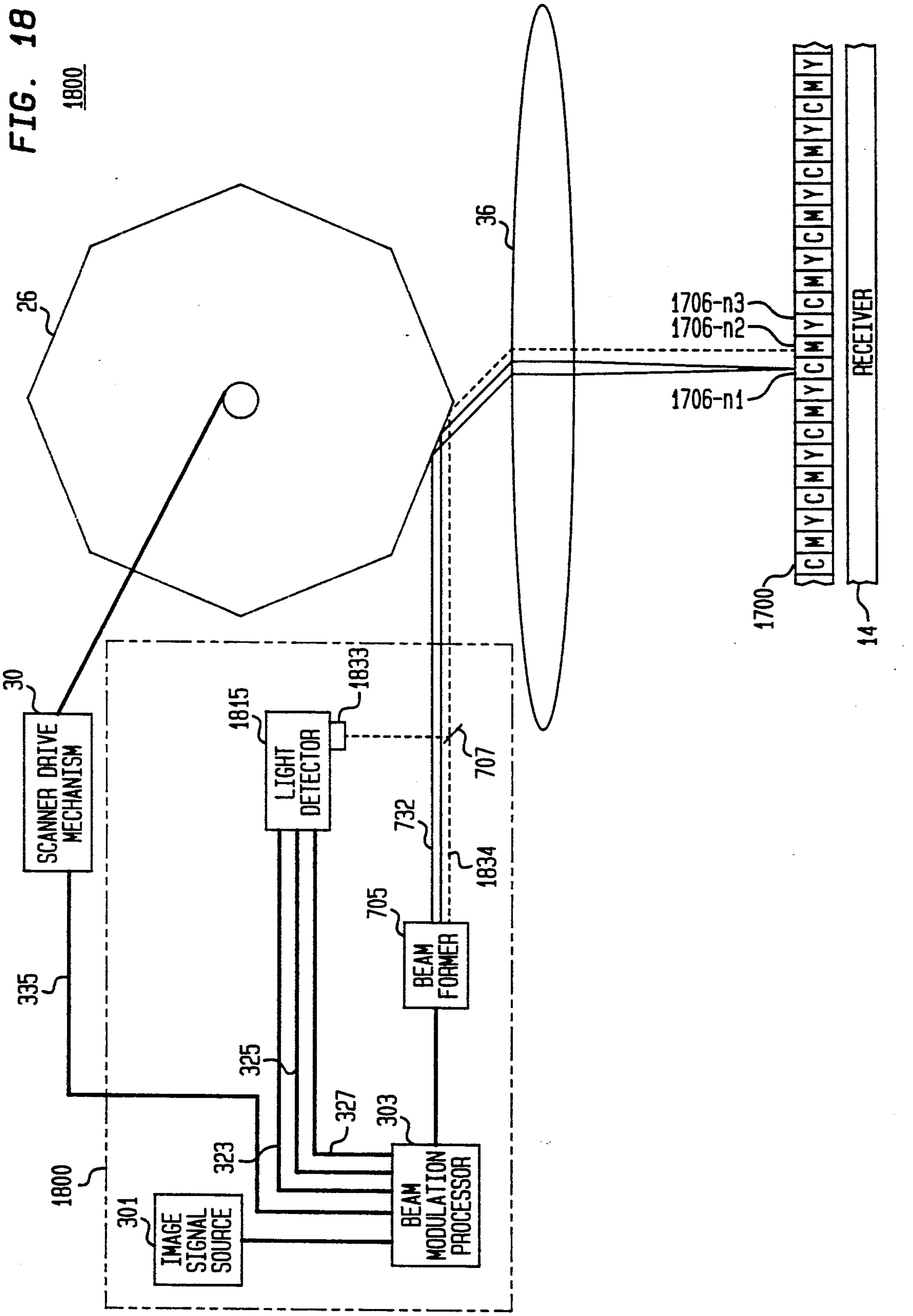
FIG. 18 is a more detailed schematic and block diagram of an embodiment of a beam scanning arrangement in the thermal printer of FIG. 1 in accordance with the present invention for use with the donor member shown in FIG. 17.

Referring now to FIG. 18, there is shown the scanner drive mechanism 30, the scan device 26, the telecentric focusing lens 36, the donor member 1700 described with respect to FIG. 17, the receiver 14, and an embodiment 1800 of the print beam controller 28 adapted for use with the embodiment 1700 of the donor member 16. The embodiment 1800 comprises the image signal source 301, the beam modulation processor 303, the beam former 705, the partial mirror 707, and a light detector 1815 having a light receiver 1833. The image source 301 is coupled to a first input of the beam modulator processor 303. An output terminal of the beam modulator processor 303 is coupled to an input of the beam former 705. A terminal of the beam modulation processor 303 is coupled to a terminal of the scanner drive mechanism 30.

The beam former 705 generates the light beam 732 to effect dye transfers which is coupled to the scan device 26 and through the telecentric focusing lens 36 to the donor member 1700. An interrogating light beam 1834 is also generated by the beam former 705. In the embodiment 1800, the interrogating light beam 1834 (shown as a dashed line) has a broad spectrum and may, for example, be a white light beam. A light receiving input 1833 of the light detector receives reflected light from the interrogating light beam 1834 via the partial mirror 707. A first output of the light detector 1815 is coupled to a first timing input of the beam modulation processor 303. A second output of the light detector 1815 is coupled to a second timing input of the beam modulation processor 303 and a third output of the light detector 1815 is coupled to a third timing input of the beam modulation processor 303.

The embodiment 1800 is substantially similar to the embodiment 700 described with respect to FIG. 7 except that the interrogating light beam 1834 has a wide spectrum and is preferably a white light beam and the light detector 1815 is responsive to the light reflected from the successive color stripes in the donor member 1700 to form successive timing signals. The timing signals from the light detector 1815 are applied directly to the timing inputs of the beam modulation processor. In this way, the modulated light beam is synchronized to the scanning of the donor member without the need for selectively placed index materials in the donor member.

The white light beam 1834 from the beam former 305 passes through the reflective partial mirror 707 and is redirected by the scan device 26 through the telecentric focusing lens 36 to successive pixel locations on the scan line of the donor member 1700. As the scan from left to right progresses, the light detector 1815 produces cyan timing signals at the times the interrogating light beam 1834 impinges on the magenta stripe of a pattern since the interrogating light beam 1834 leads the modulated light beam 732 by one stripe. In like manner, magenta timing signals are produced at the times the interrogating light beam 1834 impinges on the yellow color stripes and yellow timing signals are produced at the time the interrogating light beam 1834 impinges on the cyan color stripes.

Figure 19:
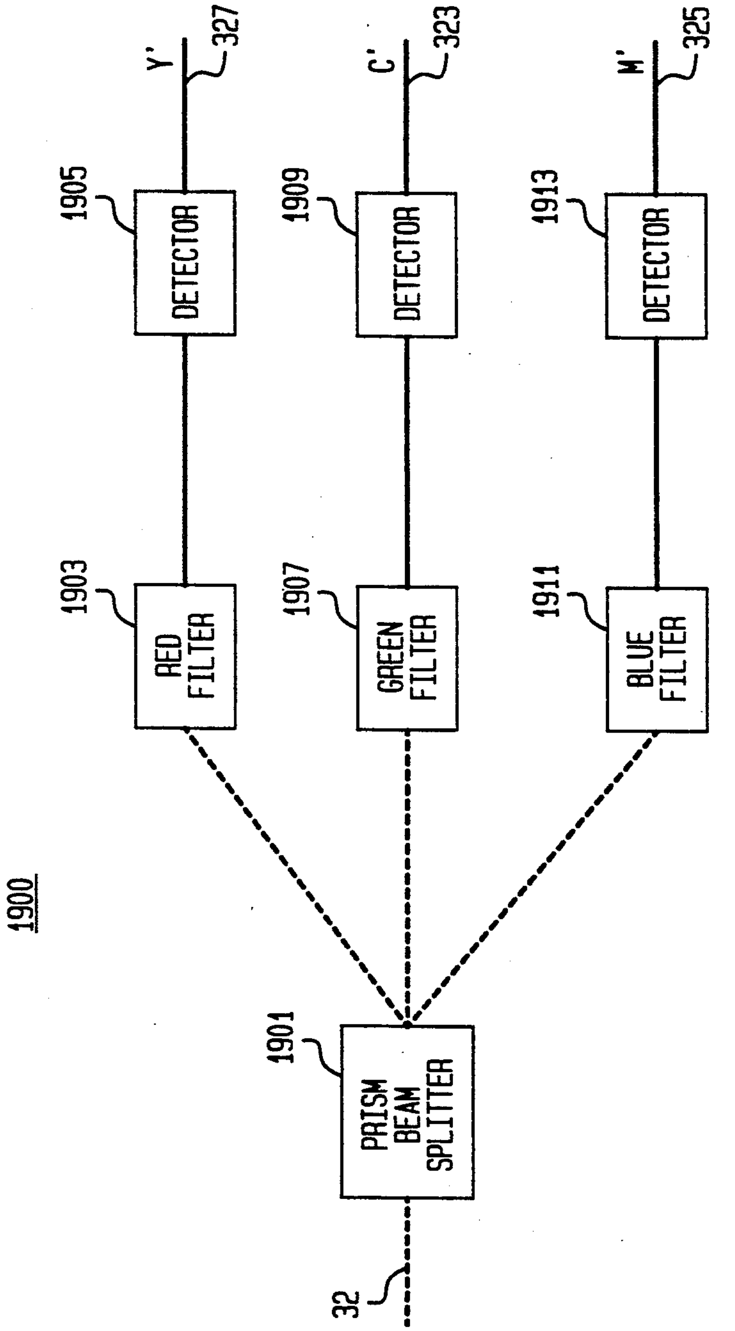
FIG. 19 is a more detailed block diagram of an embodiment of a light detector employed in the embodiment of the present invention shown in FIG. 18.

Referring now to FIG. 19, there is shown a block diagram of an embodiment 1900 of the light detector 1815 of FIG. 18. The embodiment 1900 comprises a prism beam splitter 1901, a red filter 1903, a green filter 1907, a blue filter 1911, and detectors 1905, 1909 and 1913. The prism beam splitter is optically coupled to receive the light reflections of the light beam 1834 and is optically coupled to the red filter 1903, the green filter 1907 and the blue filter 1909. An electrical output of the red filter 1903 is coupled to an input of the detector 1905. An electrical output of the green filter 1907 is coupled to an input of the detector 1909 and an electrical output of the blue filter 1911 is electrically coupled to the detector 1913. An output of the detector 1905 is coupled to the yellow timing line 327. An output of the detector 1909 is coupled to the cyan timing line 323 and an output of the detector 1913 is coupled to the magenta timing line 325.

In operation, the prism beam splitter spatially separates the spectral components of the reflected light beam 1834 as is well known in the art. The red spectral portion of the light from the prism beam splitter 1901 is directed to the red filter 1903. The green spectral portion of the light from the prism beam splitter 1901 is directed to the green filter 1907 and the blue spectral portion of the light from the beam splitter 1901 is directed to the blue filter 1911. When the reflected light applied to the prism beam splitter 1901 is from a cyan color stripe, the amount of red light from the beam prism splitter 1901 is relatively low. As a result, the electrical output of the red filter is a low level signal. The low level signal from the red filter 1903 is detected by the detector 1905 which produces a yellow timing signal Y'. When the reflected light applied to the prism beam splitter 1901 is from a magenta color stripe, the amount of green light from the beam prism splitter 1901 is relatively low. The output level from the green filter 1907 is at a low level and the detector 1909 produces a cyan timing signal C'. When the reflected light applied to the prism beam splitter 1901 is from a yellow color stripe, the amount of blue light from the beam prism splitter 1901 is relatively low. The output level from the blue filter is low and the detector 1913 produces a magenta timing signal M'.

Figure 20:
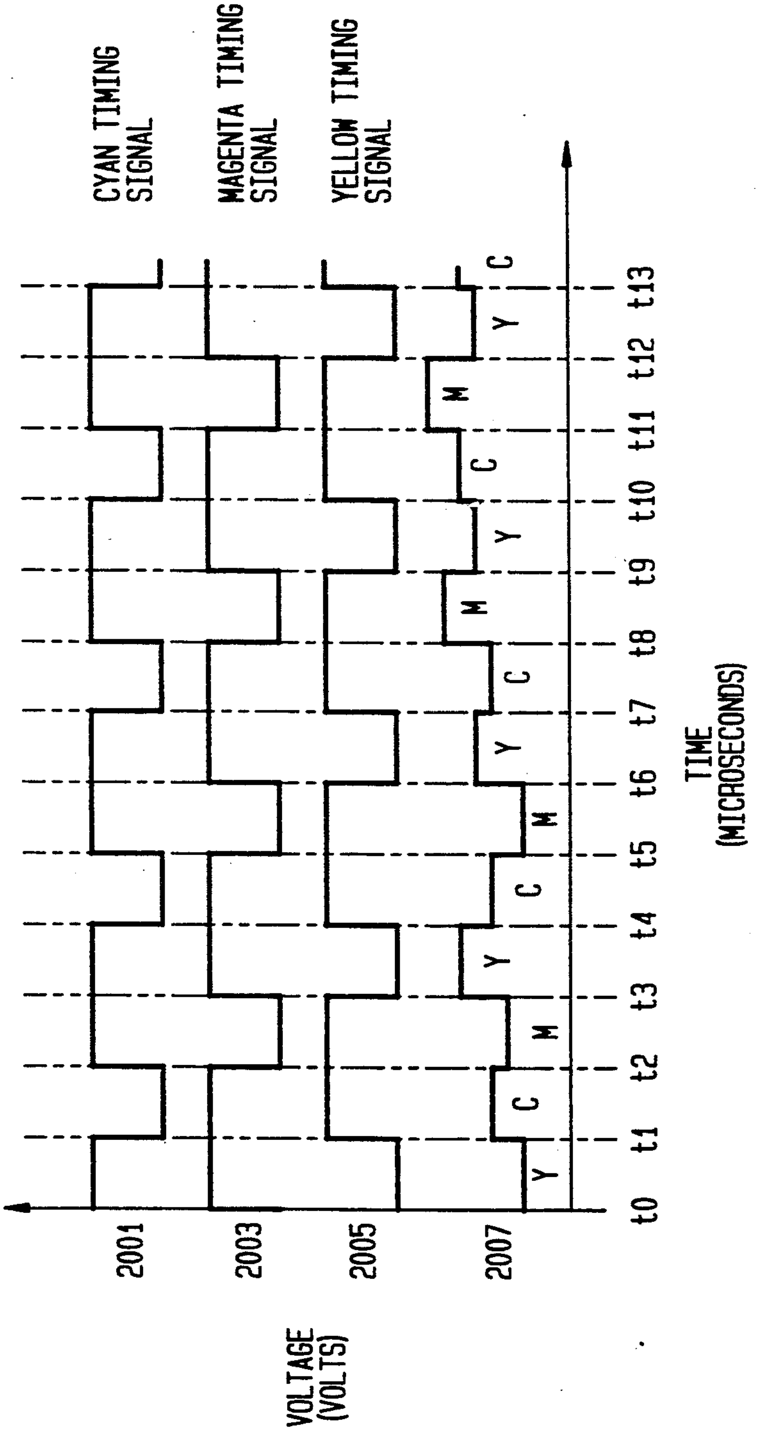
FIG. 20 shows waveforms useful in illustrating the operation of the embodiment of the invention shown in FIG. 18 with the alternative donor member of FIG. 17.

Referring now to FIG. 20, there are shown graphically pulse waveforms (volts) as a function of Time (microseconds) illustrating cyan, magenta, and yellow timing signals, and the corresponding beam modulation signal obtained in the operation of the light detector embodiment 1900 in FIG. 19. A waveform 2001 shows a succession of cyan timing signals obtained from reflections from the magenta dye stripes as the light beams scan across the stripe pattern of the donor member. A waveform 2003 shows a succession of magenta timing signals obtained from reflections from the yellow dye stripes as the light beam scan across the stripe pattern of the donor member. A waveform 2005 shows a succession of yellow timing signals obtained from reflections from the cyan dye stripes as the light beam scans across the stripe pattern of the donor member. A waveform 2007 shows the beam modulation signal obtained from the beam modulation processor 303 in the embodiment 1800 of FIG. 18.

In FIG. 20, the timing signals obtained from reflections from the color dye stripes in FIG. 18 as the broad spectrum light beam scans across the stripe pattern of the donor member are the low level portions of the waveforms 2001, 2003, and 2005. The cyan timing signals occur between the times t1 and t2, t4 and t5, t7 and t8, and t10 and t11 when the modulated light beam 732 traverses the cyan color stripes. In these time intervals, the interrogating light beam 1834 traverses the magenta color stripes and the green filter output is low. The magenta timing signals occur between the times t2 and t3, t5 and t6, t8 and t9, and t11 and t12 when the modulated light beam 732 traverses the magenta color stripes. The interrogating light beam 1834 is traversing the yellow color stripes in these time intervals and the blue filter output is low. The yellow timing signals occur between the times t3 and t4, t6 and t7, t9 and t10, and t12 and t13 when the modulated light beam 732 traverses the yellow color stripes while the interrogating light beam 1834 traverses the cyan color stripes. In these time intervals, the red filter output is low. The outputs of the detectors 1905, 1909, and 1913 are supplied to the timing inputs of the beam modulation processor 303 in FIG. 18 wherein the beam modulation signal shown in the waveform 2007 is formed by combining the cyan, magenta, and yellow image data signals with the cyan, magenta, and yellow timing signals, respectively. As indicated in the waveform 2007, the cyan modulation portions of the beam modulation signal occur during the cyan timing pulses of the waveform 2001. The magenta modulation portions of the beam modulation signal occur during the magenta timing pulses of the waveform 2003 and the yellow modulation portions of the beam modulation signal occur during the yellow timing pulses of the waveform 2005.

It is to be understood that the specific embodiments described herein are intended merely to be illustrative of the spirit and scope of the invention. Modifications can readily be made by those skilled in the art consistent with the principles of this invention. For example, a donor member having a cyan, magenta, yellow and black stripe pattern may be used and the black stripe may then include a reflective component to generate index signals. Further, when the embodiment 1000 shown in FIG. 10 is used in the single light beam arrangement as in FIG. 3, the interrogation interval may be made a much smaller portion of the color timing signal interval than T/4.

What is claimed is:

1. Thermal dye transfer printing apparatus for printing a color image comprising:

a source of image data signals including a plurality of different color image data signals for each pixel of the image;

a receiver having a plurality of pixel locations for receiving color dyes corresponding to the color image data signals;

a donor member adjacent to the receiver including successive patterns of colored stripes, each pattern including a reflective stripe and a plurality of successive color stripes associated with one of the plurality of pixel locations and each color stripe of a particular color stripe pattern including a different color dye component;

a light beam former for forming a light beam;

means coupled between the source of image data signals and the light beam former responsive to the color image data signals for producing a modulating signal to modulate the light beam formed in the light beam former with the color image data signals;

means for applying the modulating signal to the light beam former for producing a modulated light beam at an output of the light beam former;

means for scanning the modulated light beam across the successive color stripe patterns of the donor member to transfer predetermined densities of the different color dyes from the donor member to the receiver in accordance with the image data signals; and means coupled between the donor member and the means for producing a modulating signal for aligning the image data signal modulated light beam to the successive color stripes of the patterns.

2. The printing apparatus of claim 1 wherein:

the means coupled between the donor member and the light beam former for aligning the modulated light beam to the color stripe pattern includes:

means responsive to light from the modulated light beam reflected by the reflective stripe of each pattern for generating an index signal;

means responsive to the index signal for forming a sequence of color stripe timing signals in alignment with the scanning of the color stripes of the donor member by the scanning means; and means for applying the color stripe timing signals of the means for producing a modulating signal.

3. The printing apparatus of claim 2, wherein:

the particular color stripe pattern includes a reflective index stripe, a stripe having a cyan color dye component, a stripe having a magenta color dye component, and a stripe having a yellow color dye component; and the means responsive to the index signal for forming the sequence of color stripe timing signals for the particular color stripe pattern includes;

means responsive to the index signal for forming a cyan timing signal defining a distinct time interval when the modulated light beam impinges on the cyan color dye component stripe of the particular pattern;

means responsive to the index signal for forming a magenta timing signal defining a distinct time interval when the modulated light beam impinges on the magenta color dye component stripe of the particular pattern; and means responsive to the index signal for forming a yellow timing signal defining a distinct time interval when the modulated light beam impinges on the yellow color dye component stripe of the particular pattern.

4. The printing apparatus of claim 3 wherein:

the distinct time interval of the cyan timing signal occurs when the modulated light beam scans across the cyan color stripe of the particular color stripe pattern;

the distinct time interval of the magenta timing signal occurs when the modulated light beam scans across the magenta color stripe of the particular color stripe pattern; and the distinct time interval of the yellow timing signal occurs when the modulated light beam scans across the yellow color stripe of the particular color stripe pattern.

5. The printing apparatus of claim 1 wherein each pattern includes a plurality of color dye stripes and a predetermined one of the color dye stripes further comprises a reflective component.

6. The printing apparatus of claim 5 wherein:

the means coupled between the donor member and the means for producing a modulating signal for aligning the modulating of the light beam to the color stripe pattern includes:

means responsive to light from the predetermined one of the color dye stripes comprising the reflective component of each pattern for generating an index signal;

means responsive to the index signal for forming a sequence of color stripe timing signals in alignment with the color stripes of the donor member scanned by the scanning means; and means for applying the color stripe timing signals to the means for producing a modulating signal.

7. The printing apparatus of claim 6 wherein:

the particular color stripe pattern includes a stripe having a cyan color dye component, a stripe having a magenta color dye component, and a stripe having a yellow color dye component and the reflective component; and the means responsive to the index signal for forming the sequence of color stripe timing signals for the particular color stripe pattern includes;

means responsive to the index signal for forming a cyan timing signal defining a distinct time interval when the modulated light beam impinges on the cyan color dye stripe of the particular pattern;

means responsive to the index signal for forming a magenta timing signal defining a distinct time interval when the modulated light beam impinges on the magenta color dye stripe of the particular pattern; and means responsive to the index signal for forming a yellow timing signal defining a time interval when the modulated light beam impinges on the yellow color dye stripe of the particular pattern.

8. The printing apparatus of claim 7 wherein:

the distinct time interval of the cyan timing signal occurs when the modulated light beam scans across the cyan color stripe of the particular color stripe pattern;

the distinct time interval of the magenta timing signal occurs when the modulated light beam scans across the magenta color stripe of the particular color stripe pattern; and the distinct time interval of the yellow timing signal occurs when the modulated light beam scans across the yellow color stripe of the particular color stripe pattern.

9. Thermal dye transfer printing apparatus for printing a color image comprising:

a source of image data signals including a plurality of different color image data signals for each pixel of the image;

a receiver having a plurality of pixel locations for receiving color dyes corresponding to the color image data signals;

a donor member adjacent to the receiver including successive patterns of colored stripes, each pattern including a reflective stripe and a plurality of successive color stripes associated with one of the plurality of pixel locations and each color stripe of a particular color stripe pattern includes a different color dye component;

a light beam former for producing a first light beam of a prescribed intensity and a second light beam which is modulated;

means coupled between the source of image data signals and the light beam former responsive to the color image data signals for producing a signal to modulate the intensity of the second light beam with the image data signals;

means for scanning the first and second light beams across the successive patterns of the donor member;

means coupled between the donor member and the means for producing a modulating signal responsive to the scanning of the first light beam across the donor member for aligning the second light beam to the successive color stripes of the patterns; and means responsive to the second light beam scanning across the successive patterns of colored stripes of the donor member for transferring predetermined densities of the different color dye components from the donor member to the receiver in accordance with the color image data signals.

10. The printing apparatus of claim 9 wherein:

the means for aligning the second light beam to the color stripe pattern comprises:

means for reflecting light from the first light beam impinging on the reflective stripe of each pattern;

means responsive to the reflected light of the first light beam for generating an index signal for each pattern;

means responsive to the index signal for forming a sequence of color stripe timing signals in alignment with the scanned color stripes of the donor member for each pattern; and means for applying the color stripe timing signals for each pattern of the donor member to the means for producing a modulating signal for aligning the second light beam to the color stripe pattern.

11. The printing apparatus of claim 10 wherein:

the particular color stripe pattern includes a reflective index stripe, a stripe having a cyan color dye component, a stripe having a magenta color dye components, and a stripe having a yellow color dye component; and the means responsive to the index signal for forming the sequence of color stripe timing signals for the particular color stripe pattern includes;

means responsive to the index signal for forming a cyan timing signal defining a distinct time interval when the second light beam impinges on the cyan color dye stripe of the particular pattern;

means responsive to the index signal for forming a magenta timing signal defining a distinct time interval when the second light beam impinges on the magenta color dye stripe of the particular pattern; and means responsive to the index signal for forming a yellow timing signal defining a distinct time interval when the second light beam impinges on the yellow color dye stripe of the particular pattern.

12. The printing apparatus of claim 11 wherein:

the distinct time interval of the cyan timing signal occurs when the scanning means causes the second light beam to scan across the cyan color stripe of the particular color stripe pattern;

the distinct time interval of the magenta timing signal occurs when the scanning means causes the second light beam to scan across the magenta color stripe of the particular color stripe pattern; and the distinct time interval of the yellow timing signal occurs when the scanning means causes the second light beam to scan across the yellow color stripe of the particular color stripe pattern.

13. The printing apparatus of claim 9 wherein each pattern includes a plurality of color dye stripes, a predetermined one of the color dye stripes further comprising a reflective component.

14. The printing apparatus of claim 13 wherein:

the means coupled between the donor member and the means for producing a modulating signal for aligning the modulated light beam to the color stripe pattern includes:

means responsive to the first light beam reflected from the predetermined one of the color dye stripes comprising the reflective component of each pattern for generating an index signal;

means responsive to the index signal for forming a sequence of color stripe timing signals in alignment with the scanned color stripes of the donor member; and means for applying the color stripe timing signals to the means for producing the modulating signal for the second light beam.

15. The printing apparatus of claim 14 wherein:

the particular color stripe pattern includes a stripe having a cyan color dye component, a stripe having a magenta color dye component, and a stripe having a yellow color dye component and the reflective component; and the means responsive to the index signal for forming the sequence of color stripe timing signals for the particular color stripe pattern includes;

means responsive to the index signal for forming a cyan timing signal defining a distinct time interval when the second light beam impinges on the cyan color dye stripe of the particular pattern;

means responsive to the index signal for forming a magenta timing signal defining a distinct time interval when the second light beam impinges on the magenta color dye stripe of the particular pattern; and means responsive to the index signal for forming a yellow timing signal defining a time interval when the second light beam impinges on the yellow color dye stripe of the particular pattern.

16. The printing apparatus of claim 15 wherein:

the distinct time interval of the cyan timing signal occurs when the scanning means causes the second light beam to scan across the cyan color stripe of the particular color stripe pattern;

the distinct time interval of the magenta timing signal occurs when the scanning means causes the second light beam to scan across the magenta color stripe of the particular color stripe pattern; and the distinct time interval of the yellow timing signal occurs when the scanning means causes the second light beam to scan across the yellow color stripe of the particular color stripe pattern.

* * * * *